(12) United States Patent
Warren et al.

(10) Patent No.: US 11,763,050 B1
(45) Date of Patent: Sep. 19, 2023

(54) SYSTEM, METHOD, AND COMPUTER PROGRAM PRODUCT FOR AUGMENTED REALITY CIRCUIT DESIGN

(71) Applicant: Cadence Design Systems, Inc., San Jose, CA (US)

(72) Inventors: Nicholas Claude Warren, St. John's NL (CA); Matthew Noseworthy, St. Phillip's NL (CA); Liam Cadigan, St. John's NL (CA); Darryl Frank Day, St. John's NL (CA); Mihir Milan Shah, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/145,960

(22) Filed: Jan. 11, 2021

Related U.S. Application Data

(60) Provisional application No. 62/994,129, filed on Mar. 24, 2020.

(51) Int. Cl.
  *G06F 30/30* (2020.01)
  *G06F 30/31* (2020.01)
  *G06F 111/02* (2020.01)
  *G06F 115/12* (2020.01)
  *G06F 111/18* (2020.01)

(52) U.S. Cl.
  CPC .......... *G06F 30/31* (2020.01); *G06F 2111/02* (2020.01); *G06F 2111/18* (2020.01); *G06F 2115/12* (2020.01)

(58) Field of Classification Search
  CPC .. G06F 30/31; G06F 2111/02; G06F 2115/12; G06F 2111/18
  USPC .......................................................... 716/139
  See application file for complete search history.

(56) References Cited

U.S. PATENT DOCUMENTS

| | | | | |
|---|---|---|---|---|
| 6,110,213 | A | * | 8/2000 | Vinciarelli .............. G06F 30/00 703/1 |
| 8,448,100 | B1 | * | 5/2013 | Lin .......................... G03F 1/70 716/54 |
| 10,956,013 | B2 | * | 3/2021 | Nelson ................ H04L 67/1097 |
| 11,093,680 | B1 | * | 8/2021 | Melvin, III ........... G06F 30/392 |
| 2005/0268269 | A1 | * | 12/2005 | Coiley .................... G06F 30/31 716/113 |
| 2018/0068502 | A1 | * | 3/2018 | Oesterle ................. G07C 5/008 |
| 2018/0136255 | A1 | | 5/2018 | Albert et al. |

FOREIGN PATENT DOCUMENTS

WO  WO-2020202155 A1 * 10/2020  ......... H05K 13/0015

* cited by examiner

*Primary Examiner* — Jack Chiang
*Assistant Examiner* — Brandon Bowers
(74) *Attorney, Agent, or Firm* — Mark H. Whittenberger, Esq.; Holland & Knight LLP

(57) ABSTRACT

Embodiments include herein are directed towards a method for use in an electronic design environment is provided. Embodiments may include receiving, at a client electronic device, work instructions corresponding to an electronic circuit. Embodiments may further include displaying a graphical representation of the electronic circuit at a display screen associated with the client electronic device and displaying at least one instruction at the display screen, wherein displaying includes highlighting a component of the electronic circuit at the display screen.

13 Claims, 19 Drawing Sheets

SYSTEM, METHOD, AND COMPUTER PROGRAM PRODUCT FOR AUGMENTED REALITY CIRCUIT DESIGN

RELATED APPLICATION

This application claims the benefit of the following U.S. Provisional Application No.: 62/994,129, filed on March 24, 2020; the entire contents of which are incorporated herein by reference.

FIELD OF THE INVENTION

The present disclosure relates to augmented reality platforms, and more specifically, to a system, method and computer program product that allows for printed circuit board (PCB) debug, rework, assembly, and inspection through the use of augmented reality technology.

DISCUSSION OF THE RELATED ART

As is known in the art, augmented reality (AR) is a direct or indirect live view of a physical, real-world environment wherein elements are "augmented" by computer-generated perceptual information (i.e. a visualization), ideally across multiple sensory modalities (e.g., visual, auditory, haptic, somatosensory, and olfactory). The overlaid sensory information may be constructive (e.g., additive to the natural environment) or destructive (e.g., masking of the natural environment) and may be spatially registered with the physical world such that the overlaid sensory information may be perceived as an immersive aspect of the real environment. Augmented reality may include technology that superimposes a computer-generated image on a user's view of the real world, and provide a composite view.

Accordingly, augmented reality may alter a user's current perception of a real world environment (as opposed to virtual reality that replaces the real world environment with a simulated one). One of the benefits of augmented reality is that it allows components of the digital world to be brought into a person's perception of the real world through the integration of immersive sensations that are perceived as natural parts of an environment.

In existing computer aided electronic design approaches design files contain details of the PCB but the information may be difficult and time consuming to search through. An example of an electronic design files include industry standard electronics manufacturing output files and a native computer aided design files. An example of an industry standard electronics manufacturing output file is a Gerber file. Gerber files are an open 2D binary vector image file format. It is the standard file used by printed circuit board (PCB) industry software to describe the printed circuit board images: copper layers, solder mask, legend, and drill and route data. Native computer aided design files are typically formatted files generated by specific PCB design software programs. For a PCB, one file may hold all of the information necessary for a manufacturer to fabricate the board. As these files are all-inclusive in terms of PCB design information, checked for errors, and the design-fabrication process is therefore faster than when using other traditional PCB design formats, such as Gerber files. Collectively, files used in the electronic design of a PCB (for example, but not limited to, native computer aided design files and industry standard electronic design files) may be referred to as electronic design automation (EDA) files.

SUMMARY

In one or more embodiments of the present disclosure, a computer-implemented method for use in an electronic design environment is provided. The method may include receiving, at a client electronic device, work instructions corresponding to an electronic circuit. The method may further include displaying a graphical representation of the electronic circuit at a display screen associated with the client electronic device and displaying at least one instruction at the display screen, wherein displaying includes highlighting a component of the electronic circuit at the display screen.

One or more of the following features may be included. Receiving the work instructions may include receiving the work instructions from a second computing device. The work instructions may correspond to one or more of a PCB assembly task, an electronic circuit testing task, an electronic circuit inspection task, a re-work task, a board bring-up task, or a debugging procedure. Displaying at least one instruction may include displaying a plurality of instructions in stages at the display screen. The method may include allowing a user to select a first component of the electronic circuit at the display screen. The method may further include displaying a first work instruction corresponding to the first component. The method may also include allowing a user to select a subcircuit of the electronic circuit at the display screen. The method may further include displaying a subcircuit work instruction, based upon, at least in part, the selected subcircuit.

In one or more embodiments of the present disclosure a computer-readable storage medium having stored thereon instructions, which when executed by a processor result in one or more operations is provided. Operations may further include receiving, at a client electronic device, work instructions corresponding to an electronic circuit. Operations may further include displaying a graphical representation of the electronic circuit at a display screen associated with the client electronic device and displaying at least one instruction at the display screen, wherein displaying includes highlighting a component of the electronic circuit at the display screen.

One or more of the following features may be included. Receiving the work instructions may include receiving the work instructions from a second computing device. The work instructions may correspond to one or more of a PCB assembly task, an electronic circuit testing task, an electronic circuit inspection task, a re-work task, a board bring-up task, or a debugging procedure. Displaying at least one instruction may include displaying a plurality of instructions in stages at the display screen. Operations may include allowing a user to select a first component of the electronic circuit at the display screen. Operations may further include displaying a first work instruction corresponding to the first component. The method may also include allowing a user to select a subcircuit of the electronic circuit at the display screen. Operations may further include displaying a subcircuit work instruction, based upon, at least in part, the selected subcircuit.

In one or more embodiments of the present disclosure, a system for use in an electronic design environment is provided. The system may include a client electronic device configured to receive work instructions corresponding to an electronic circuit. The client electronic device may be further configured to display a graphical representation of the electronic circuit at a display screen associated with the client electronic device and to display at least one instruction at the display screen, wherein displaying includes highlighting a component of the electronic circuit at the display screen.

One or more of the following features may be included. Receiving the work instructions may include receiving the work instructions from a second computing device. The work instructions may correspond to one or more of a PCB assembly task, an electronic circuit testing task, an electronic circuit inspection task, a re-work task, a board bring-up task, or a debugging procedure. Displaying at least one instruction may include displaying a plurality of instructions in stages at the display screen.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
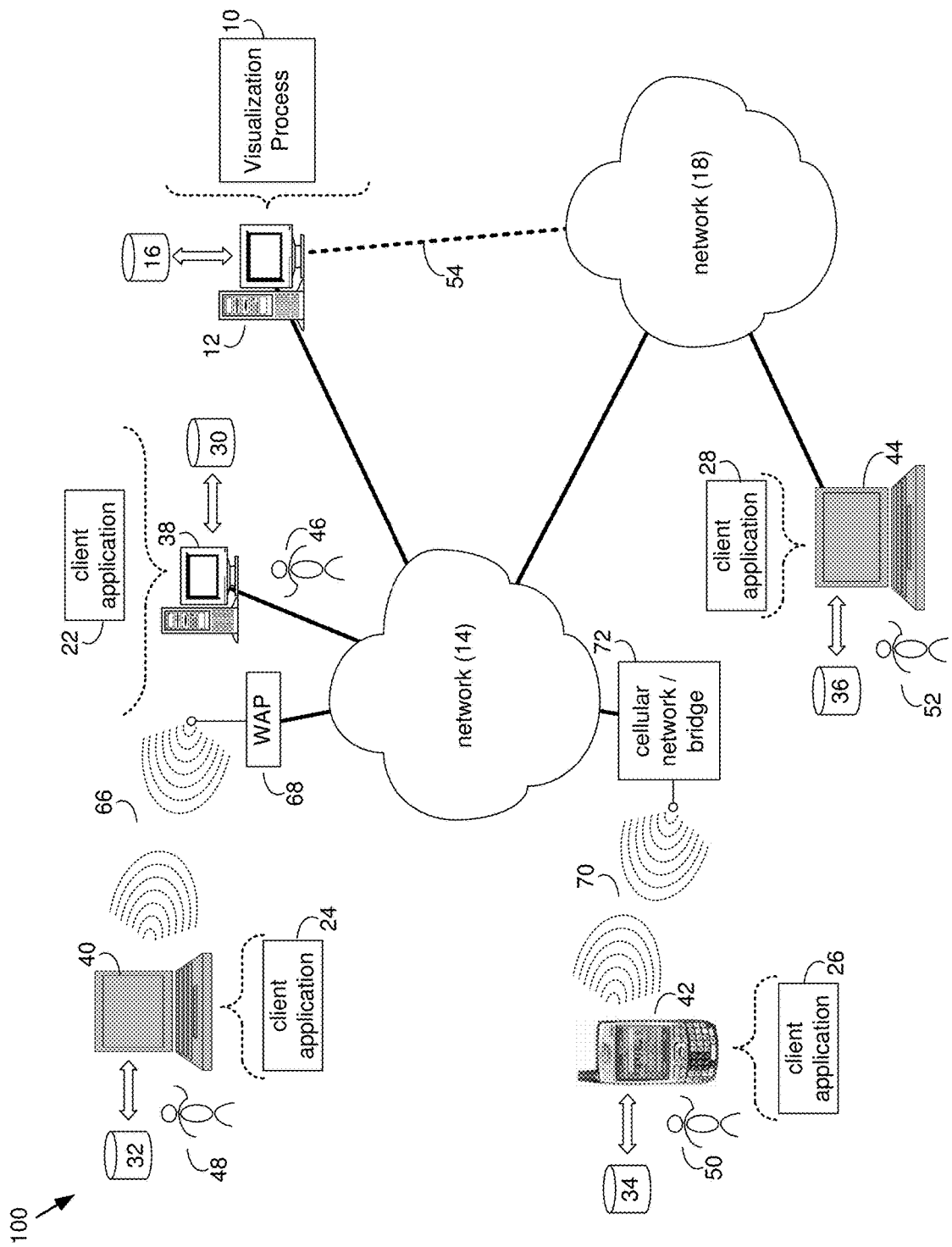
FIG. 1 is a diagram depicting an embodiment of a system in accordance with the present disclosure.

Embodiments of the present disclosure are directed towards systems and methods that allow for PCB debug, rework, assembly, and inspection through the use of augmented reality technology.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device)

may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (e.g., through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosures. Some hardware description languages may include, but are not limited to, Verilog, VHDL, and Verilog-AMS. Various other hardware description languages may also be used as well.

Referring to FIG. 1, there is shown visualization process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally / alternatively, visualization process 10 may reside on and be executed, in whole or in part, by a client electronic device, such as a personal computer, notebook computer, personal digital assistant, smart phone, tablet, or the like. The client electronic device may be running an operating system and or a mobile operating system, examples of which may include but are not limited to: Microsoft® Windows®; Apple® macOS®; Apple® iOS®; Google® Android™;or Red Hat® Linux®. (Apple and macOS are registered trademarks of Apple Inc., registered in the U.S. and other countries or both; iOS is a registered trademark Cisco in the U.S. and other countries and is used under license to Apple; and Google and Android are trademarks of Google LLC in the United States, other countries or both.)

The instruction sets and subroutines of visualization process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to:

Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Visualization process 10 may be a standalone application, or may be an applet/application/script. In addition/as an alternative to being a server-side process, the visualization process 10 may be a client-side process (not shown) that may reside on a client electronic device (described below). As such, the processes may reside, in whole, or in part, on server computer 12 and/or one or more client electronic devices.

The instruction sets and subroutines of visualization process 10, which may be stored on storage device 16 coupled to server computer 12, may be executed by one or more processors (not shown) and one or more memory modules (not shown) incorporated into server computer 12.

The instruction sets and subroutines of visualization process 10, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smartphone, netbook, a tablet computing device, or the like), notebook computer 44, a virtual reality device, an augmented reality device, a camera, a webcam, for example. Using client applications 22, 24, 26, 28, users 46, 48, 50, 52 may access visualization process 10. Client electronic devices 38, 40, 42, 44 may include a viewing device such as a built in camera (such as, but not limited to, the camera on a laptop computer or a smartphone), or an external camera (such as, but not limited to an additional device, a smartphone, a webcam).

Users 46, 48, 50, 52 may access visualization process 10 directly through the device on which the client application (e.g., client applications 22, 24, 26, 28) is executed, namely client electronic devices 38, 40, 42, 44, for example. Users 46, 48, 50, 52 may access visualization process 10 directly through network 14 or through secondary network 18. Further, server computer 12 (e.g., the computer that executes visualization process 10) may be connected to network 14 through secondary network 18, as illustrated with phantom link line 54. Some or all of the operations discussed herein with regard to visualization process 10 may be performed, in whole or in part, in the cloud as a cloud-based process including, for example, networks 14, 18 and any others.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

Referring now to FIGS. 2-18, numerous examples consistent with embodiments of visualization process 10 are provided.

Figure 2:
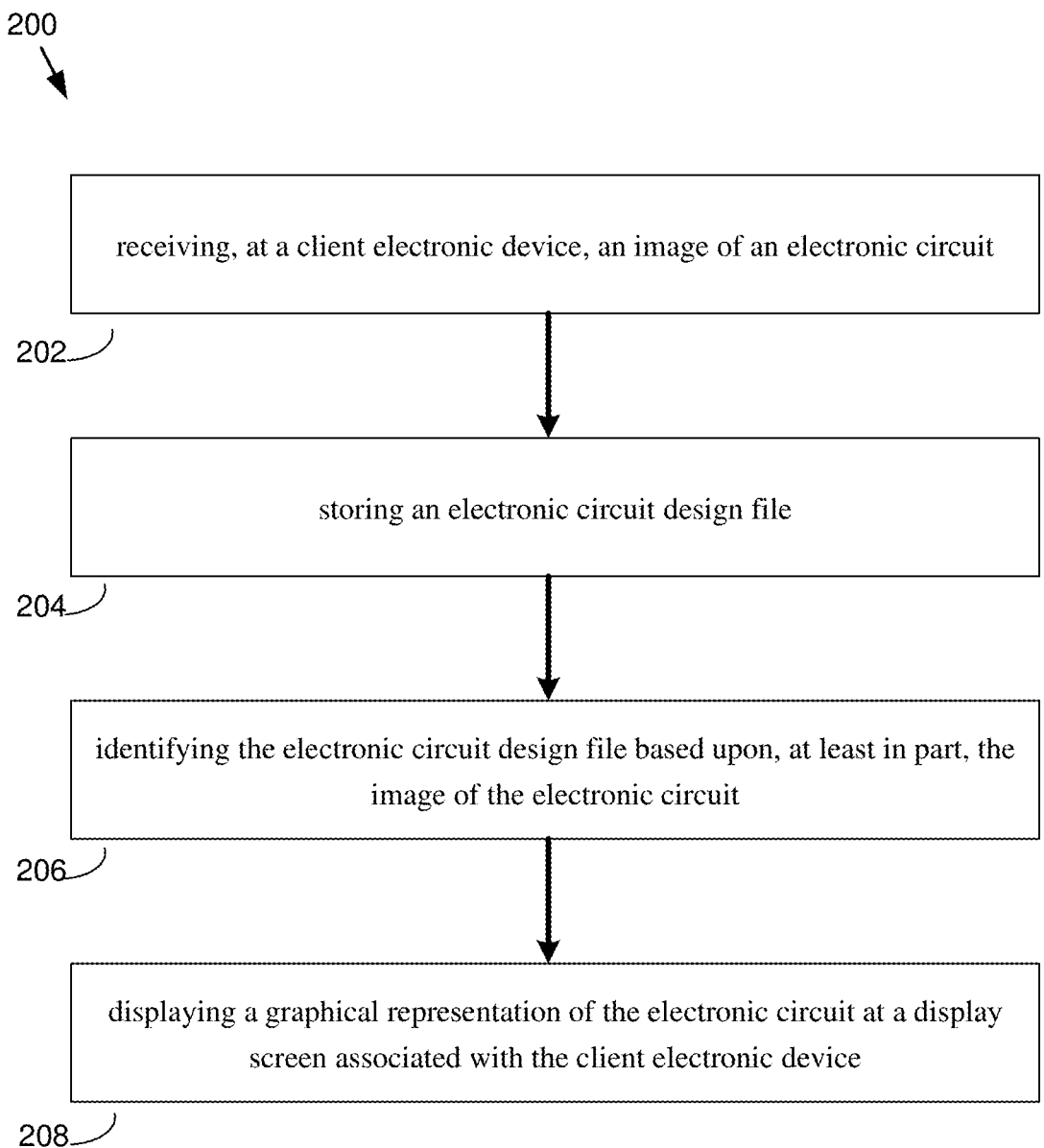
FIG. 2 is a flowchart depicting operations consistent with the visualization process in accordance with an embodiment of the present disclosure.

Referring now to FIG. 2, an example flowchart 200 depicting operations for automatically identifying an electronic circuit design file and displaying a graphical representation of the electronic circuit. Visualization process 10 may include receiving (202), at a client electronic device, an image of an electronic circuit and storing (204) an electronic circuit design file. The method may also include identifying (206) the electronic circuit design file based upon, at least in part, the image of the electronic circuit. The method may further include displaying (208) a graphical representation of the electronic circuit at a display screen associated with the client electronic device.

One or more of the following features may be included. The electronic circuit design file may be stored on the client electronic device or at a server computing device. The method may include providing an option to highlight a user-selectable subportion of the electronic circuit. The method may further include displaying a highlighted subportion at the display screen. The client electronic device may be one of a smartphone, a virtual reality device, an augmented reality device, a camera, a tablet computing device, a laptop computing device, or a webcam. Displaying may include displaying the graphical representation at a 1:1 scale with the image. The image may be received via a camera associated with the client electronic device or a video received from the client electronic device. Displaying may include displaying one or more component details associated with the electronic device. The electronic circuit design file may be selected from the group consisting of industry standard electronics manufacturing output files or native computer aided design files. Numerous other operations are also within the scope of the present disclosure.

Figure 3:
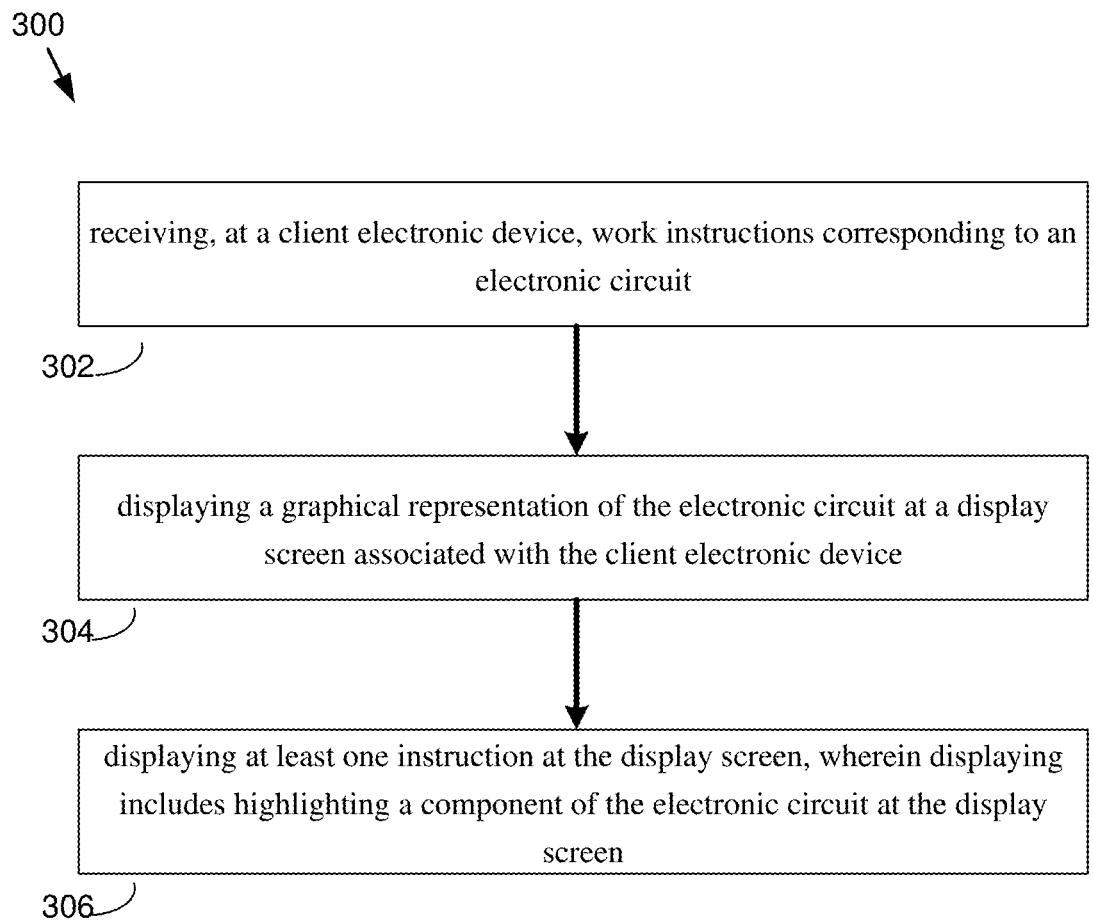
FIG. 3 is a flowchart depicting operations consistent with the visualization process in accordance with an embodiment of the present disclosure.

Referring now to FIG. 3, an example flowchart 300 depicting operations for automatically receiving a work instruction corresponding to an electronic circuit and displaying at least one instruction is provided. Visualization process 10 may include receiving (302), at a client electronic device, work instructions corresponding to an electronic circuit, and displaying (304) a graphical representation of the electronic circuit at a display screen associated with the client electronic device. The method may also include displaying (306) at least one instruction at the display screen, wherein displaying includes highlighting a component of the electronic circuit at the display screen. Numerous other operations are also within the scope of the present disclosure.

One or more of the following features may be included. Receiving the work instructions may include receiving the work instructions from a second computing device. The work instructions may correspond to one or more of a PCB assembly task, an electronic circuit testing task, an electronic circuit inspection task, a re-work task, a board bring-up task, or a debugging procedure. Displaying at least one instruction may include displaying a plurality of instructions in stages at the display screen. The method may include allowing a user to select a first component of the electronic circuit at the display screen. The method may further include displaying a first work instruction corresponding to the first component. The method may also include allowing a user to select a subcircuit of the electronic circuit at the display screen. The method may further include displaying a subcircuit work instruction, based upon, at least in part, the selected subcircuit.

Figure 4:
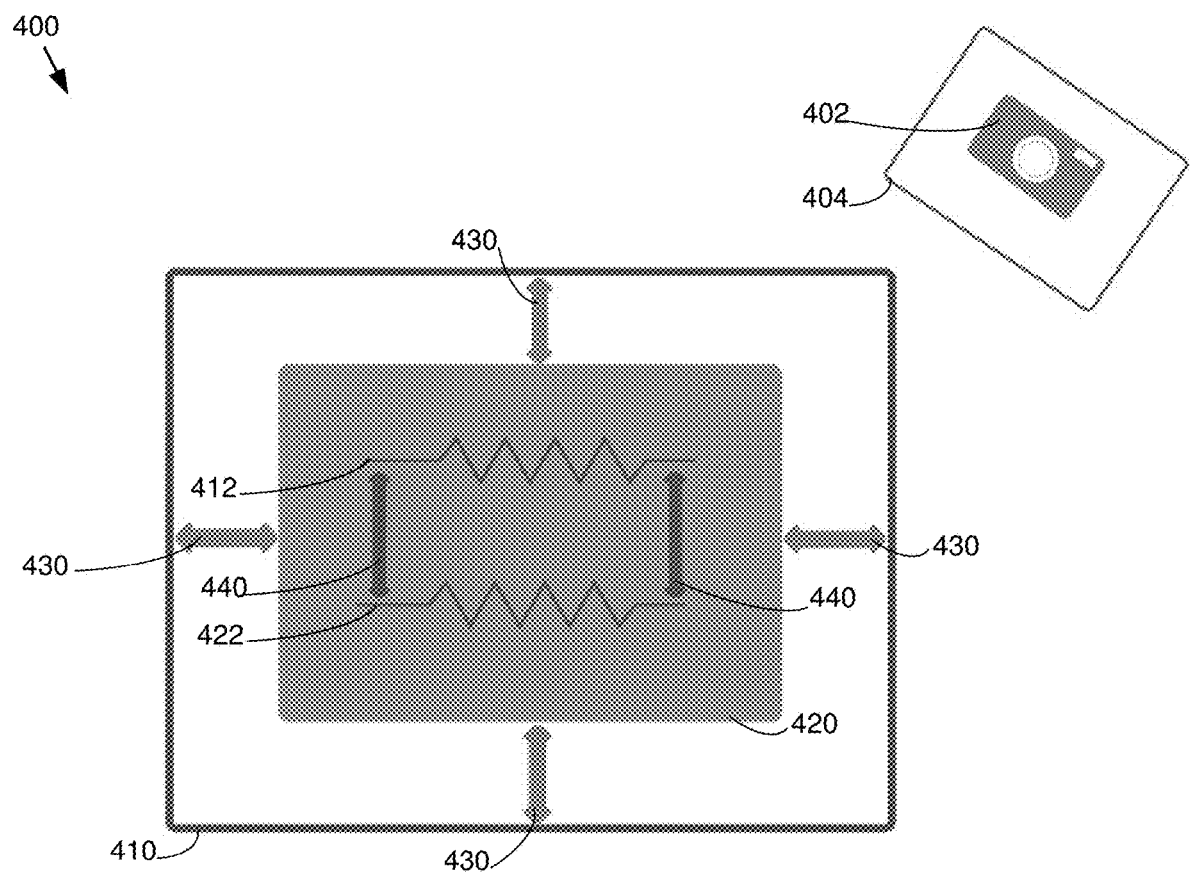
FIG. 4 is a diagram depicting calibration operations consistent with the visualization process in accordance with an embodiment of the present disclosure.

Referring now to FIG. 4, an example diagram 400 depicting a calibration of visualization process 10 is provided. Prior to calibration, a user (e.g., users 46, 48, 50, 52) may select an option to store an EDA file and visualization process 10 may receive and store the EDA file. Additionally, the user may select an option to store PCB artwork and visualization process 10 may receive and store the PCB artwork. Data may be stored by visualization process 10 on a server computing device or on a client electronic device. The data stored may be accessed and extracted by visualization process 10 to determine information such as, but not limited to, the location of PCB design elements located on PCB 420, metadata associated with the nets and components (e.g. voltage, resistance, part numbers, etc.), and the physical size of the PCB and location of features. The design elements may represent the information stored in EDA files such as, but not limited to components and nets.

Camera 402 may be communicatively connected to a client electronic device (e.g., client electronic devices 38, 40, 42, 44) and may be accessed by visualization process 10. Camera 402 may lie in a camera plane 404, which may be different than the plane of PCB 420. Camera plane 404 may be the plane parallel to the lens of the camera 402.

During calibration, the user may be guided to position camera plane 404 to be parallel or approximately parallel to PCB 420. The user may be guided to position the camera 402 and camera plane 404 into an appropriate viewing angle, such as above PCB 420. When camera plane 404 is approximately parallel to PCB 420, camera 402 may have a view that is approximately parallel to PCB 420.

In some embodiments of visualization process 10, an algorithm may be provided so the camera (e.g., smartphone camera, virtual reality headset, augmented reality headset, external camera connected to a desktop computer, etc.) may recognize a user's PCB (or even a picture of a PCB) based on the user's EDA file. From the uploaded EDA file, visualization process 10 may be able to understand the dimensions and image of the board, and correctly identify the PCB when it is in view of the camera and overlay the PCB design in a 1:1 scale so all design parameters line up perfectly and are overlaid exactly on top of their representative elements on the PCB (e.g., superimposed).

In some embodiments, a mask representing the design elements of PCB 420 may be displayed on the client electronic device. The mask may guide the user to rotate PCB 420 or camera 402. The mask may represent a known orientation of PCB 420. The mask may be a graphical overlay, superimposed over an image of PCB 420. The image of PCB 420 may be obtained by camera 402, another imaging device, or a composite of images and/or videos from one or more devices.

Once an image of PCB 420 is taken, the image may be analyzed by visualization process 10. During analysis, an edge detection algorithm may determine the location of the outer edges of PCB 420. The edge detection algorithm may include algorithms, for example, but not limited to, Canny edge detection. The edge detection algorithm may determine all edges in the board, then may look for intersections between these edges in roughly the same shape as PCB 420. The shape of PCB 420 may be determined from meta data in the EDA file. For example, a rectangular shaped object may be determined via a length/width ratio. In other embodiments, other shaped objects are easily implemented. The edge detection algorithm may display where the object given in the EDA file is located. The edge detection algorithm may provide a best estimation of the location where the object given in the EDA file is located, and the edge detection algorithm may allow for manual adjustments. The edge detection algorithm may give more weight in the algorithm to edges found near the outer area of the screen.

Based on, at least, the edge detection algorithm, visualization process 10 may superimpose the design elements of PCB 420 onto the image captured by camera 402, thereby creating a superimposed element 412. Superimposed element 412 may be displayed to the user through the client electronic device. Superimposed element 412 may include one or more of the design elements of PCB 420. Visualization process 10 may create a superimposed edge 410 and display superimposed edge 410 to the user through the client electronic device. Superimposed edge 410 may correspond to the shape of PCB 420.

Visualization process 10 may calculate an offset 440 between superimposed element 412 and a real-world design element 422, (e.g., the design elements physically present on PCB 420). Visualization process 10 may automatically determine offset 440 based on, at least, the edge detection algorithm. Based on offset 440, the user may have the option to adjust some of the superimposed design elements to better match with the elements physically on PCB 420. For example, visualization process 10 may provide the option to the user to create adjustment 430 to align superimposed edge 410 with the edge of PCB 420. After any adjustments, such as adjustment 430, are made, visualization process 10 may remove the background of the image taken by camera 402 thereby creating an edited image. In some embodiments, PCB 420 is then turned over so the other side is visible to camera 402 and the calibration process is repeated.

Once calibration is complete, camera 402 may lie in a different plane than PCB 420. Visualization process 10 may adjust the view of the mask to match the plane of PCB 420 seen by camera 402 using an image tracking algorithm. The image tracking algorithm may be used to establish a homography between camera plane 404 and the plane of PCB 420. The edited image of the PCB may be used by visualization process 10 to compute the homography. See FIG. 12 for a further discussion on image tracking.

Figure 5:
FIG. 5 is a graphical user interface (GUI) provided to a user to select a previously uploaded electronic design automation (EDA) file in accordance with an embodiment of the present disclosure.

Now referring to FIG. 5, a graphical user interface (GUI) 500 is provided to the user with an option to select an electronic design automation (EDA) file in accordance with an embodiment of the present disclosure. GUI 500 provides the user with the option to select a user uploaded and stored EDA. The EDA file may be stored in a location connected with visualization process 10, for example, but not limited to, cloud storage or stored in a location such as in a client electronic device. In some embodiments, visualization process 10 may identify the EDA file based on, at least in part, the image of the PCB. GUI 500 and GUI examples provided hereinafter may be located in an electronic design environment of visualization process 10.

Figure 6:
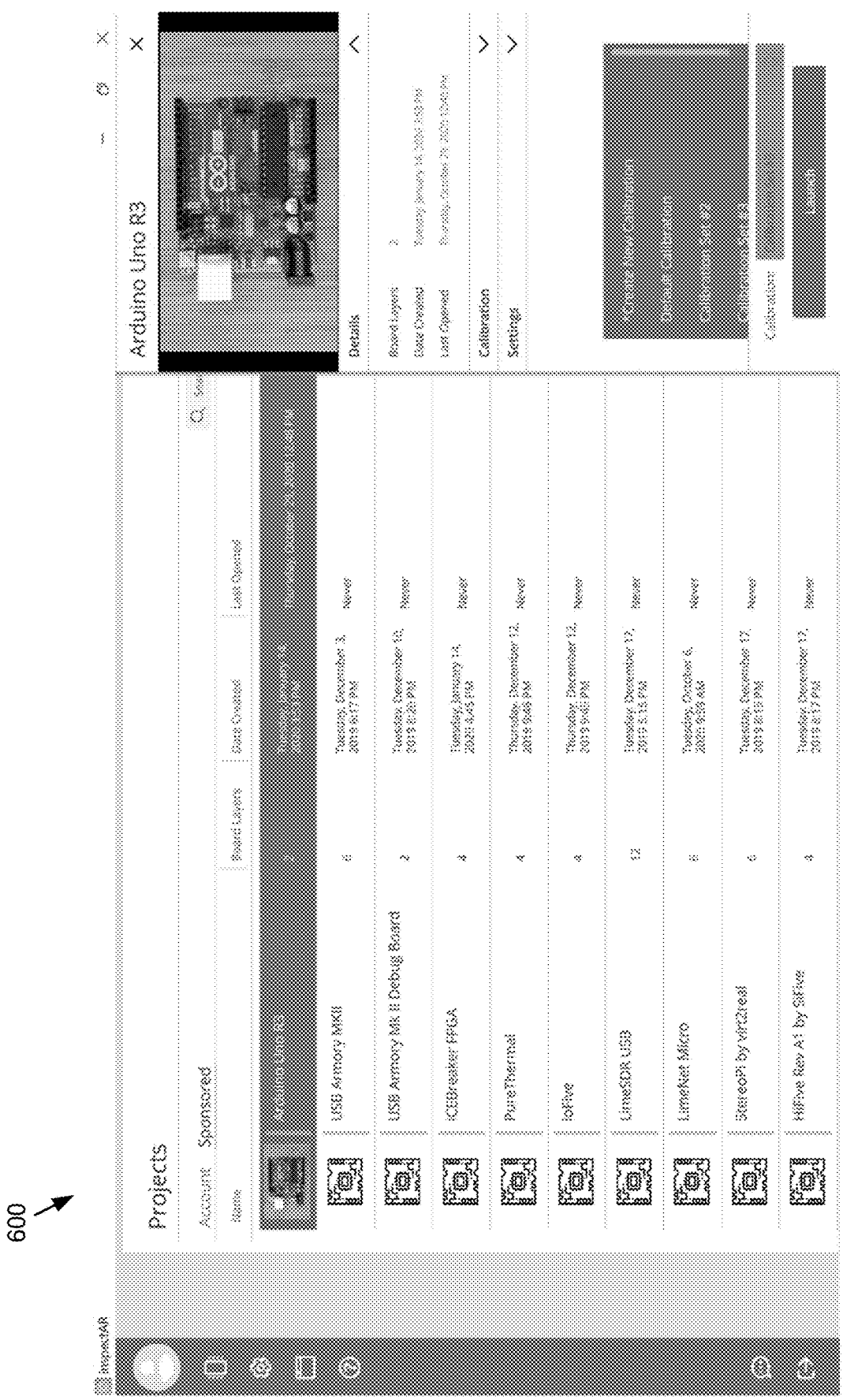
FIG. 6 is a GUI provided to the user to select a predefined EDA file in accordance with an embodiment of the present disclosure.

Now referring to FIG. 6, a GUI 600 is provided to the user to select a predefined EDA file in accordance with an embodiment of the present disclosure. GUI 600 may include a list of predefined EDA files (e.g., widely available PCBs) that the user may have the option to select. The EDA files in the list of predefined EDA files may be included in visualization process 10 without needing the user to store the EDA file in visualization process 10.

In GUI 500, GUI 600 or both, when the user selects a PCB, visualization process 10 may provide board details, calibration details, and settings of the selected PCB. Calibration details may include the ability to select and use past calibrations completed. However the user may have an option to create a new calibration for the PCB.

Figure 7:
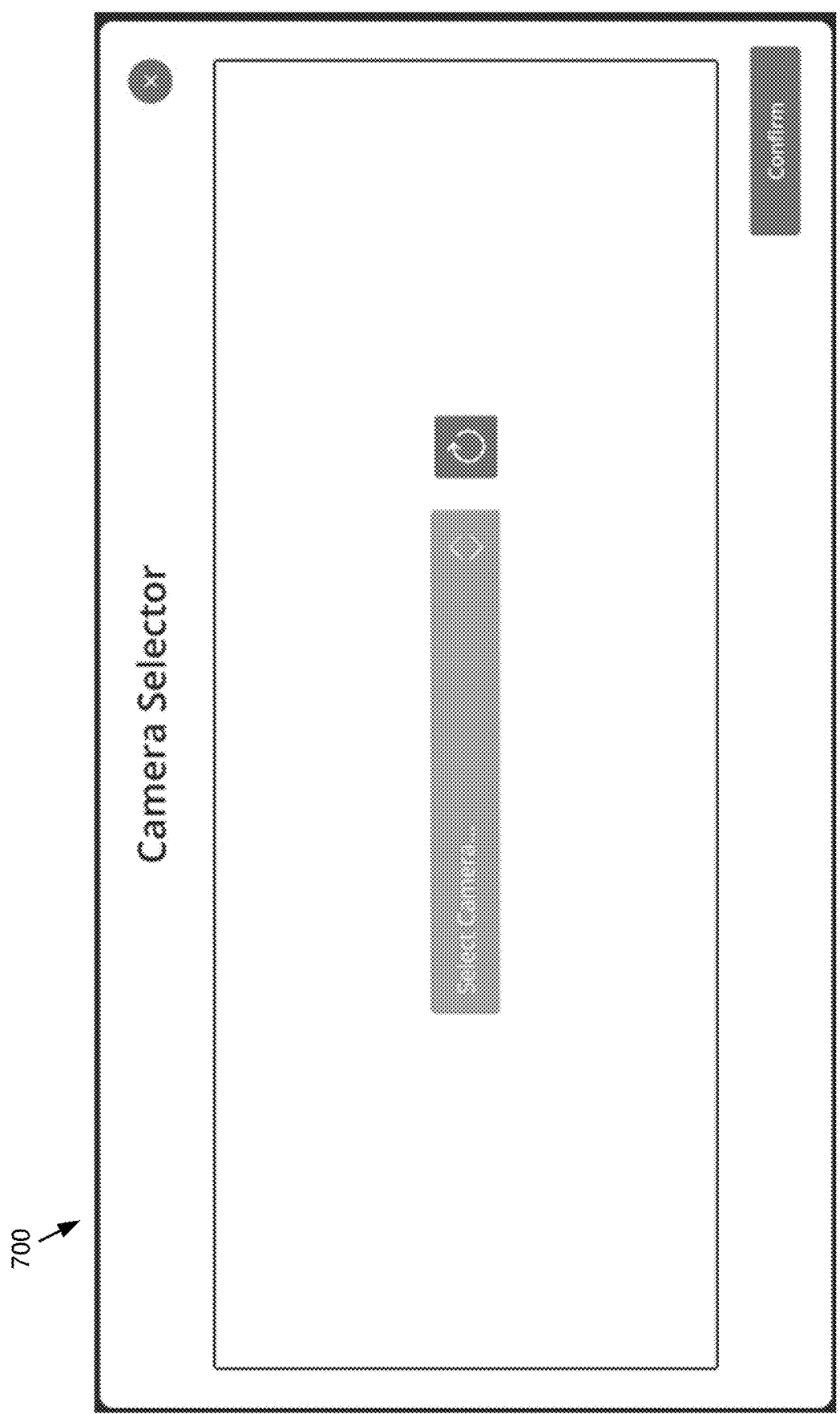
FIG. 7 is a GUI provided to the user to select a camera in accordance with an embodiment of the present disclosure.

Now referring to FIG. 7, a GUI 700 is provided to the user to select a camera in accordance with an embodiment of the present disclose. Visualization process 10 may provide via GUI 700, at least, the option to select the camera that will be used for calibration and/or the camera that will provide the video or image of the PCB during operation. Visualization process 10 may automatically search for at least one of, but not limited to: devices with a camera connected to the client electronic device, devices with a camera connected to the network, and cameras built into client electronic devices.

Figure 8:
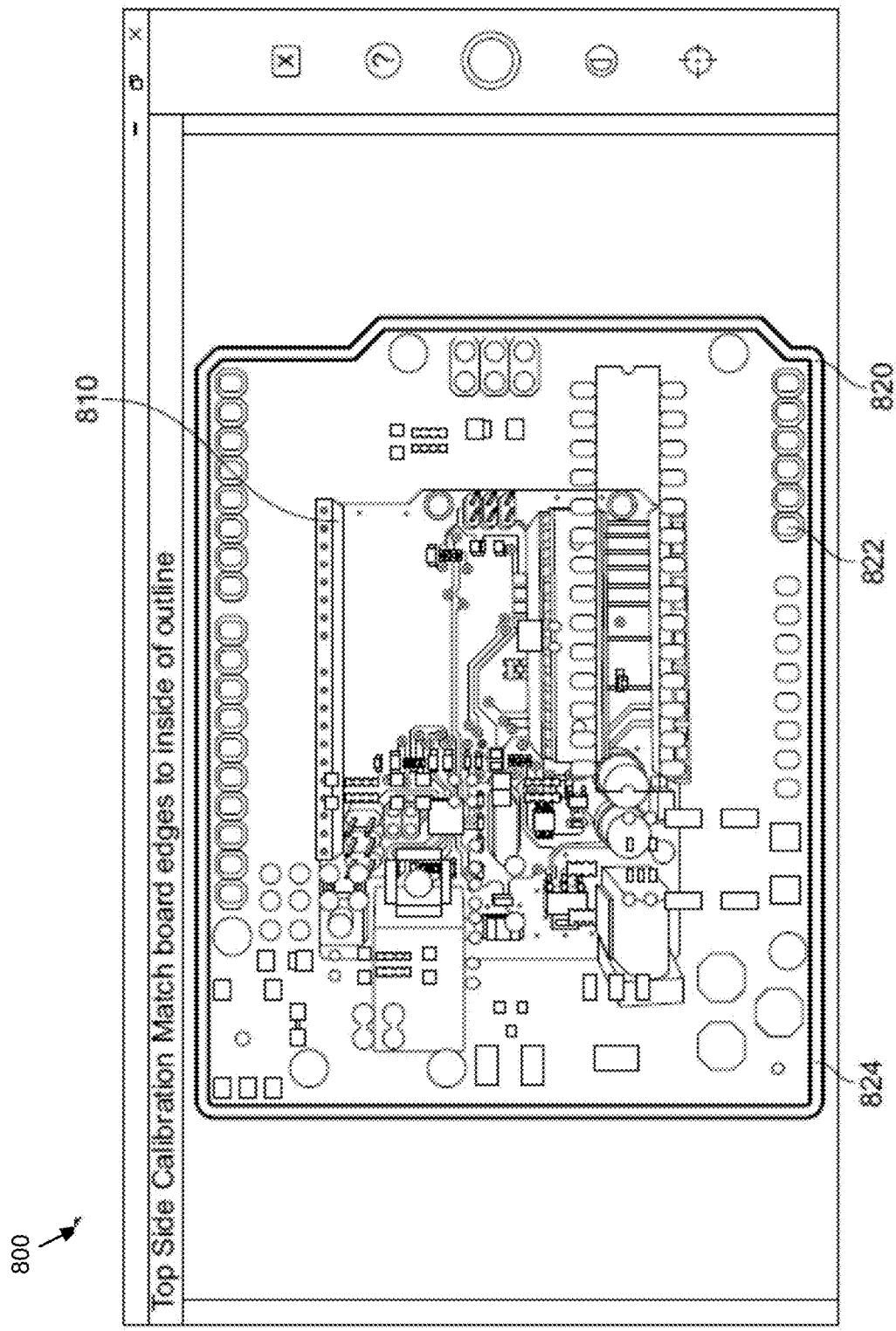
FIG. 8 is a GUI depicting a step of a printed circuit board (PCB) calibration process in accordance with an embodiment of the present disclosure.
Figure 9A:
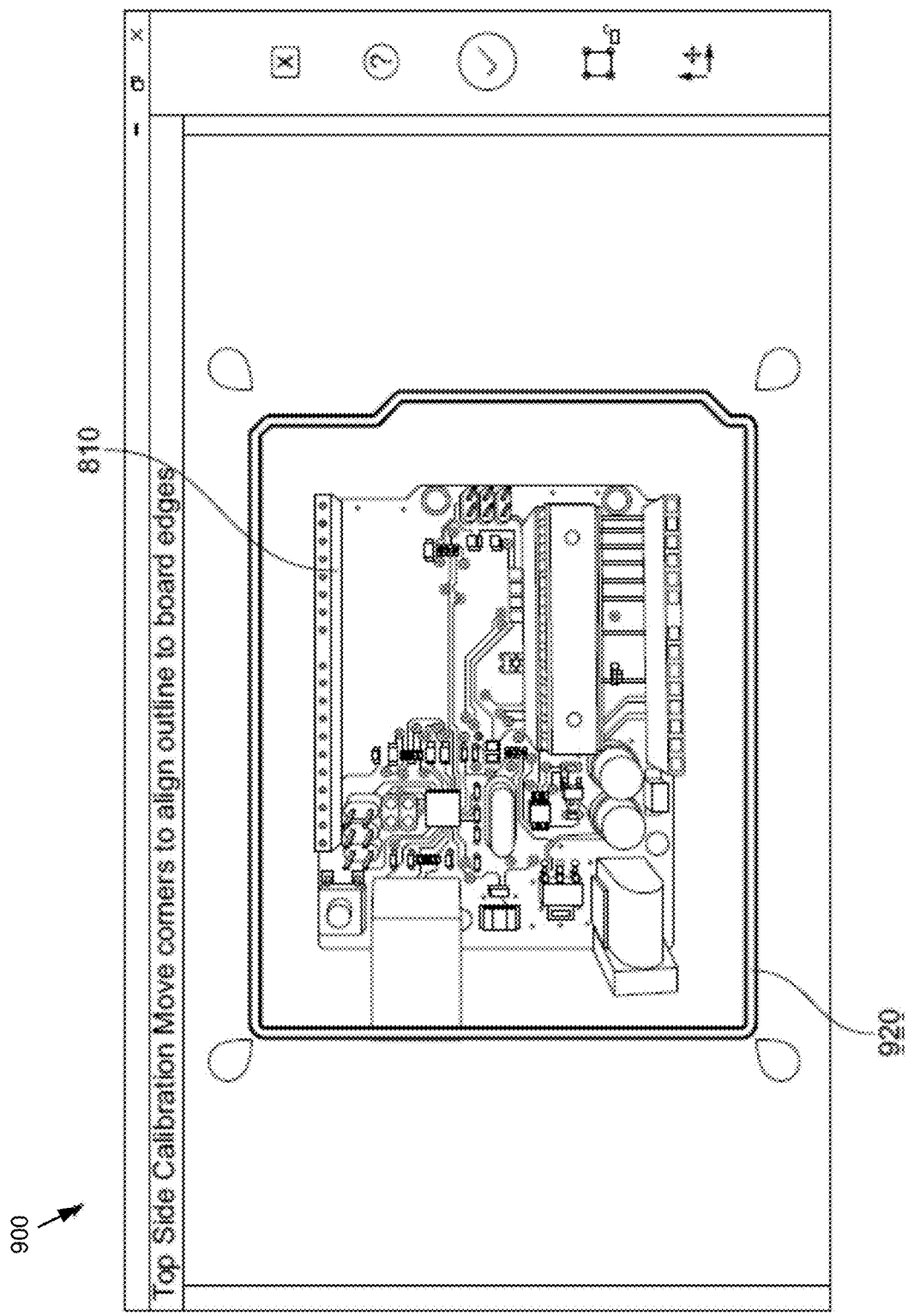
FIG. 9a is a GUI depicting a step of the PCB calibration process in accordance with an embodiment of the present disclosure.
Figure 9B:
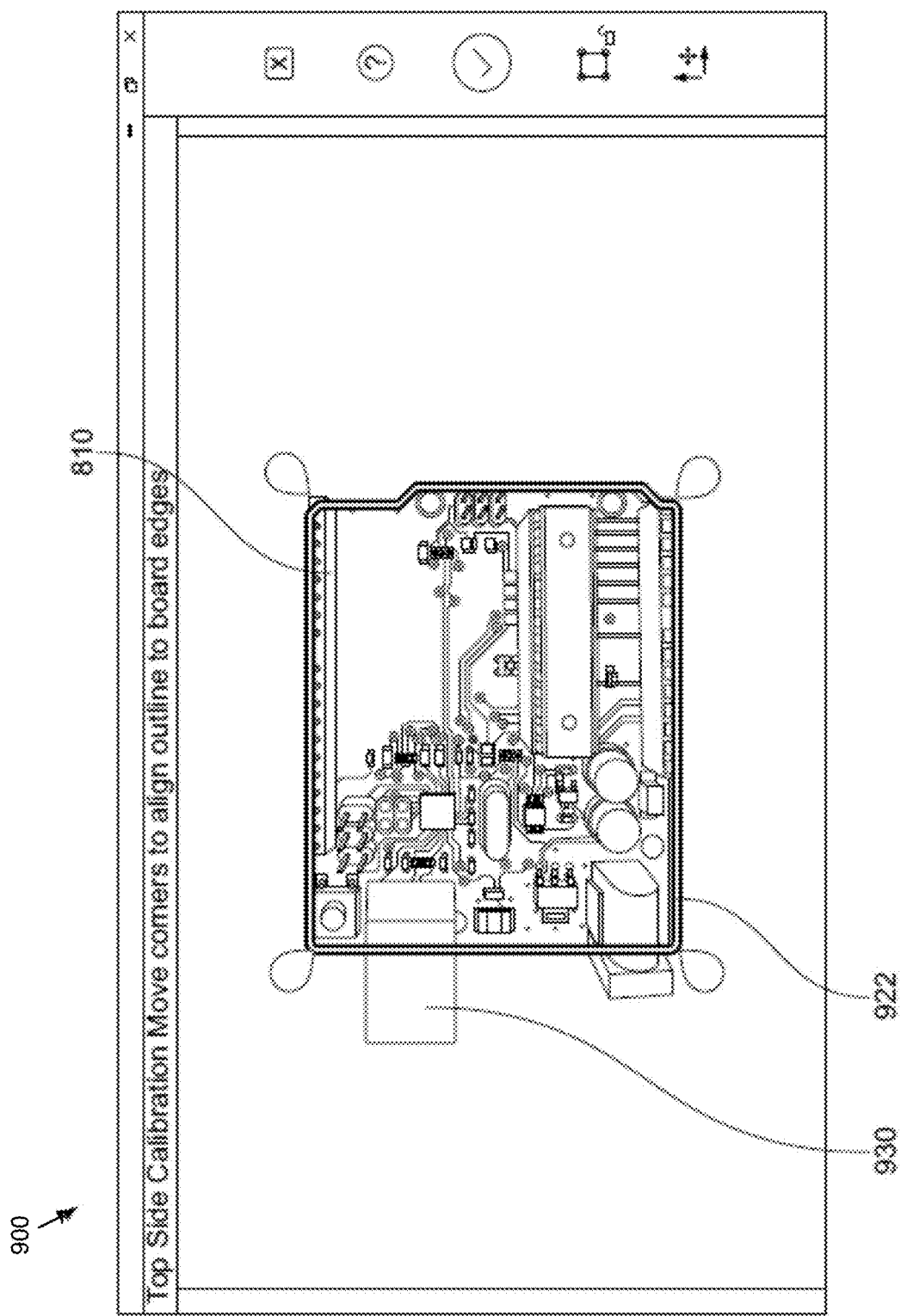
FIG. 9b is a GUI depicting a step of the PCB calibration process in accordance with an embodiment of the present disclosure.

Now referring to FIGS. 8, 9a, and 9b, an example calibration process is depicted for visualization process 10. The example calibration process provides an example method of recognizing an image and overlaying a PCB design. Visualization process 10 may guide a user to take a picture of the PCB they want to use. Visualization process 10 may ensure the picture is level with the camera. Visualization process 10 may utilize a pitch and roll meter in communication with the camera to alert the user when the camera is in a sufficient position for capturing the image. The image may be taken by clicking a button on the screen. In some embodiments, the image may be taken automatically. Once photo is taken, the user may be alerted to adjust the image to ensure the PCB is in the frame; thereby ensuring the dimensions and area for which the design will ultimately be superimposed will be precise and 1:1 scale between the overlay and the physical PCB. A 1:1 scale may provide for the superimposed elements to match up on top of their physical counterpart on the physical PCB. For example, component C1, as viewed in a GUI from visualization process 10, may be overlaid directly on top of component C1 on the physical PCB.

FIG. 8 is a GUI 800 depicting a step of a PCB calibration process in accordance with an embodiment of the present disclosure. Specifically, a mask 820 representing design elements of PCB 810 superimposed over an image of PCB 810 is provided. The image of PCB 810 may be captured by a camera (e.g. camera 402). Mask 820 may be superimposed over the image of PCB 810 on the client electronics device. Mask 820 may be generated from at least one of, an EDA file, an image of PCB 810, and artwork of PCB 810. Mask 820 may include a superimposed element 822 and a superimposed edge 824. Mask 820 may include a plurality of superimposed elements. The plurality of superimposed elements may include the elements visible on the surface of PCB 810. Mask 820 may include a depiction of the silkscreen on the surface of PCB 810. Using mask 820 the user may be assisted by visualization process 10 to capture an image of PCB 810. GUI 800 may alert the user to adjust the board, camera, or both so that the alignment of the board is in the same orientation as mask 820. For example, mask 820 may depict the topside of PCB 810 in an orientation where the power supply is in the top left. GUI 800 and mask 820 may then guide the user take an image of the topside of PCB 810 with the power supply is in the top left. The use of the power supply as a reference point is for example only, various orientations of PCBs during calibration are contemplated for this disclosure.

FIG. 9a depicts a GUI 900 of the PCB calibration process in accordance with an embodiment of visualization process 10. Specifically, a user adjustment of a superimposed edge 920 of PCB 810 is provided. Once the image of PCB 810 is captured (e.g., after FIG. 8) the user may be provided an option by visualization process 10 through a GUI, such as GUI 900, to align a design element. An example of a design element may be, but is not limited to, an edge of a PCB. For example, in FIG. 9a using the edge of PCB 810 as the design element, the GUI 900 provides superimposed edge 920 to be adjusted by the user. Superimposed edge 920 may be adjustable by the user to better align one or more edges of PCB 810 with the image captured by the camera. Superimposed edge 920 may represent the shape of PCB 810. The shape of PCB 810 may be obtained from an industry standard electronics manufacturing output file, a native computer aided design file, and an edge recognition algorithm. The edge recognition algorithm may automatically align the edge of the PCB with the image captured by the camera.

FIG. 9b depicts GUI 900 of the PCB calibration process in accordance with an embodiment of visualization process 10. Specifically, a result of a user adjustment of the superimposed edge 920 is provided. The user may be provided by visualization process 10 with an updated superimposed edge 922 after the user makes the adjustment to superimposed edge 920, as seen in FIG. 9a. In FIG. 9b, updated superimposed edge 922 may outline the edge of PCB 810 in the image taken by the camera. Updated superimposed edge 922 may be configurable to outline the edge of PCB 810 and may outline the edge of PCB 810 even if the edge of PCB 810 is obscured in the image by a component. For example, component 930 extends beyond the edge of PCB 810 and thus obscures the edge of PCB 810 in the image, however superimposed edge 922 may still be configured to follow the edge of the of PCB 810. While FIGS. 8, 9a, and 9b, depict adjustment of the superimposed edges of PCB 810 in the image taken by the camera, other design elements are contemplated by this disclosure as user adjustable to improve alignment of the EDA file to the image taken by the camera.

Figure 10:
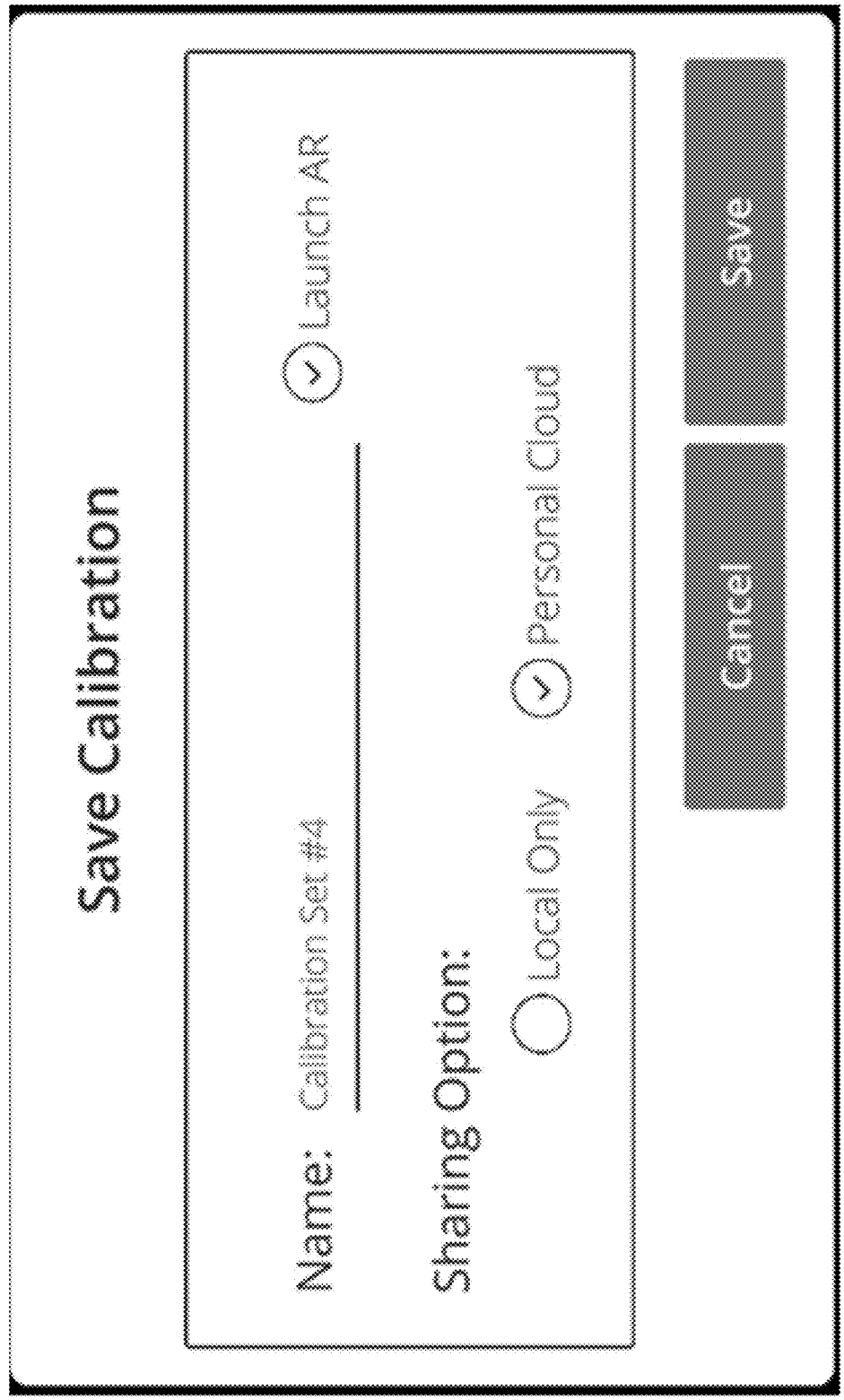
FIG. 10 is a GUI provided to the user to store calibration information in accordance with an embodiment of the present disclosure.

Now referring to FIG. 10, a GUI 1000 depicting a step to save a calibration of a PCB (e.g. PCB 810) is provided in accordance with an embodiment of the present disclosure. GUI 1000 may provide the option to save the calibration of a PCB for later use. Saving may refer to as storing data into the memory of a computing device. For example, the data may be saved to memory in a client electronic device or saved to a cloud storage location. The cloud storage device may be accessible to more than one user and may be accessible from multiple client electronic devices. The user may have the option through visualization process 10 to access data saved in the cloud (e.g., calibration data and EDA file information) by using sign on credentials to access the previously saved work. By having the ability to save the calibration, the user may be able to more quickly start visualization process 10 for a previously calibrated PCB.

Figure 11:
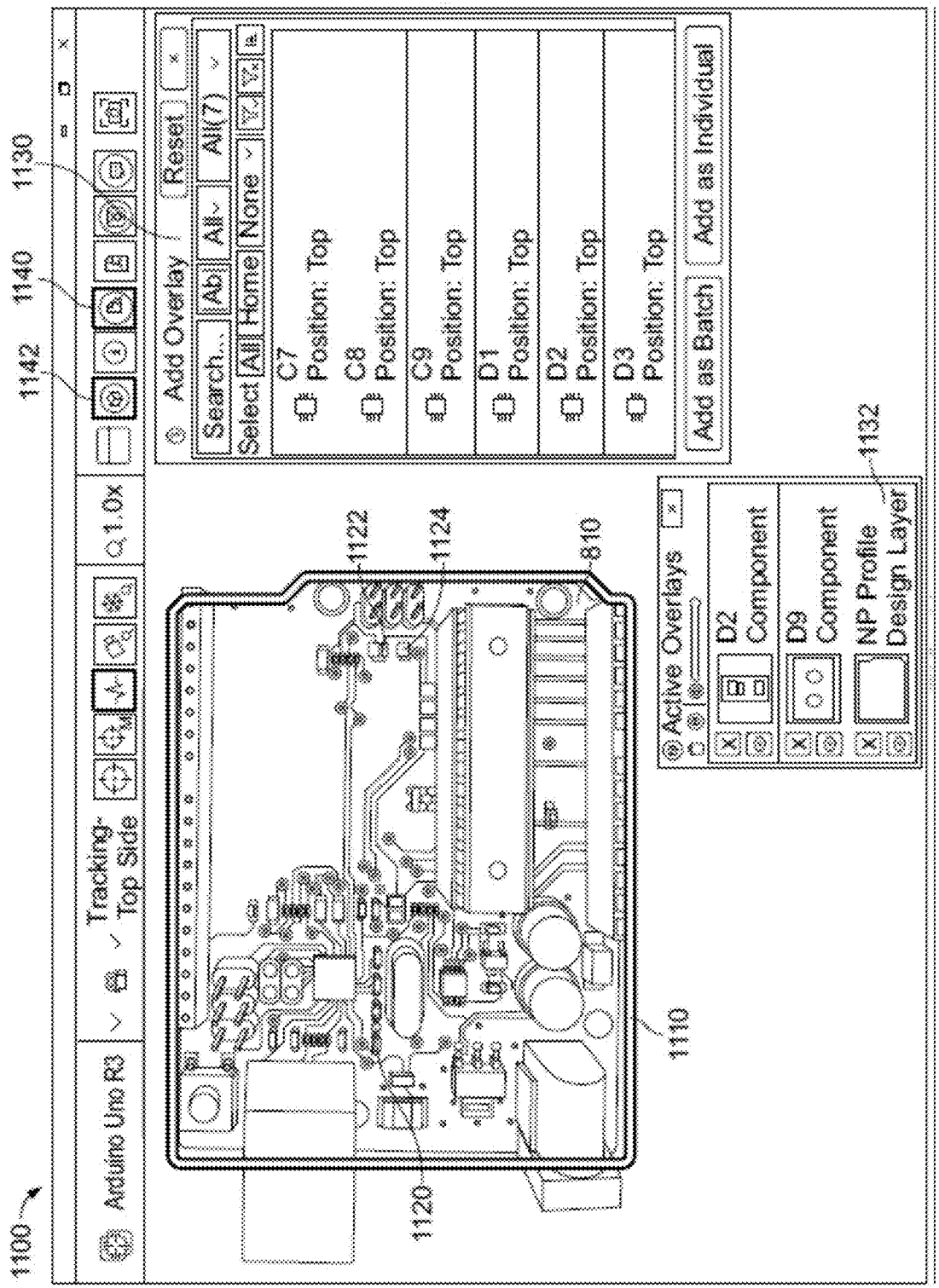
FIG. 11 is a GUI depicting the visualization process after board recognition in accordance with an embodiment of the present disclosure.

Now referring to FIG. 11, a GUI 1100 depicting an embodiment of visualization process 10 after board recognition is provided in accordance with an embodiment of the present disclosure. Specifically GUI 1100 may occur after calibrating PCB 810, as shown in FIGS. 8-10. PCB 810 is used as an example PCB in FIG. 11 but other PCBs may also be utilized with visualization process 10 and GUI 1100.

Once PCB 810 has been recognized, a graphical representation of PCB 810 may be displayed and tracked in GUI 1100. The user may have the option to interact with PCB 810 and the associated EDA file through GUI 1100. A camera may provide a video of PCB 810 with user-selectable information superimposed over at least one of, but not limited to, an image, and a video. Information superimposed over at least one of an image, and a video in visualization process 10 may also be referred to generally as an overlay. GUI 1100 and other GUIs provided as examples may provide a graphical representation of the electronic circuit of the PCB (e.g. PCB 810).

In some embodiments, overlays may be represented by boxing and/or highlighting items in a way that is visually apparent to the user. Some examples include, but not limited to, applying a colored box around a component that the user wishes to see (e.g., putting a green box around a particular capacitor that the user wants to locate on the circuit board, or highlighting the traces/wires on the circuit board that are carrying a particular signal that the user wants to see, like the input power signal). This visualization and ability to access and parse through the PCB information about the components and nets of the PCB may assist the user in performing component rework and assembly, highlight signals for measurement, immediately locate components on a board, and allow for even more debugging, testing, and assembly.

A user may have the option through visualization process 10 to be able to select different views with any combination of signals, layers, nets, and components (e.g. subportions) they would like to see superimposed onto the PCB through interactions with visualization process 10. The signals may be highlighted, and the components themselves are highlighted and/or boxed to ensure differentiation and visibility by the user. Information (e.g., metadata on the selected subportions) may be presented via menus or windows (see FIGS. 13-16). Information windows may show the user the various layers and components that are connected to the signals, along with information such as components and their pinouts, values, signal connections, and more.

Overlays may be added by the user clicking, tapping, or otherwise interacting with PCB 810 through GUI 1100 and the graphical representation of PCB 810 included within GUI 1100. For example, if the user is on a laptop computer clicks on a component 1122, a superimposed overlay 1124 may be added to the image of PCB 810. The user may select one or more subportions of PCB 810. Subportions of PCB 810 may include anything less than the entire PCB 810. A portion of the circuit of PCB may be referred to as a subcircuit. Overlays of the selected subportions may be placed at a 1:1 scale with the image of PCB 810. GUI 1100 may provide the user with the ability to see an image or video of PCB 810, while being able to interact with PCB 810 such as, for example, see overlays, interact with different layers of PCB 810, and display information about selected subportions.

In some embodiments, the user may have the option to access further information about component 1122. Overlays may be added via an add overlay window 1130. Add overlay window 1130 may include a list of all components, all nets, and all signals on PCB 810. The user may be able to add one or more overlays representing board information to the information superimposed over PCB 810 displayed on GUI 1100 from add overlay window 1130. Board information may include such as, but not limited to, individual components, signals and/or nets. The user may be provided with the option to select and add board information as a batch to the information superimposed over PCB 810 from add overlay window 1130. Batch addition of board information may allow the user to quickly superimpose information over PCB 810 into GUI 1100. Add overlay window 1130 may allow for searching for board information and/or properties of the board components to allow the user to quickly locate the desired components. For example, a user may have the option to search "3V" in add overlay window 1130 to find all components that require 3 volts to operate.

An example of overlays can be seen as board outline 1110, component overlay 1120, and component overlay 1124 in FIG. 11. Board outline 1110 may be displayed to the user on client electronic device, for example, to show the boundaries of PCB 810 being tracked by visualization process 10 and displayed with GUI 1100. Component overlay 1120 and component overlay 1124 show an example of components selected by the user. Component overlay 1120 and component overlay 1124 represent physical components C9 and D2, respectively, and are represented on the superimposed image of PCB 810. Overlays (e.g. component overlay 1120 and component overlay 1124) may represent one or more of a component, a net, and signal on the physical PCB by placing a marking (such as a shape and/or line) directly over the respective component, net, and/or signal. For example, component overlay 1120 may represent component C9 by placing two circles superimposed on the image of PCB 810 in GUI 1100. Visualization process 10 may include, for example, but not limited to, a plurality of component overlays, a plurality of net overlays, and other pertinent PCB information such as ground locations, that can be selected by the user. Selected overlays may be saved to a client electronic device or to cloud storage to quickly recall overlays that were previously setup by the user.

One or more overlays may also be saved and shared locally to a client electronic device or saved and shared via the clouds. By sharing an overlay or several overlays with other users, these other users can quickly see the most pertinent information for the current task. This allows a more senior user to create sets of overlays for tasks such as, but not limited to, debugging a PCB for less experienced users.

Active overlay window 1132 may provide the user with the ability to quickly manipulate the information superimposed over PCB 810 in GUI 1100. Active overlay window 1132 may include a feature to delete a selected overlay from the superimposed information currently being shown to the user. Active overlay window 1132 may also include a feature to temporarily hide a selected overlay. An example of a selected overlay is component overlay 1120 which may be added to GUI 1100 by selecting component C9 in add overlay window 1130. Active overlay window 1132 may include a feature to change the transparency of an overlay. Features may include, but are not limited to, buttons or sliders.

Add overlay window 1130 may be accessible in GUI 1100 by button 1140. Likewise, active overlay window 1132 may be accessible in GUI 1100 by button 1142. Button 1140 and button 1142 may toggle the visibility of add overlay window 1130 and active overlay window 1132, respectively.

Figure 12:
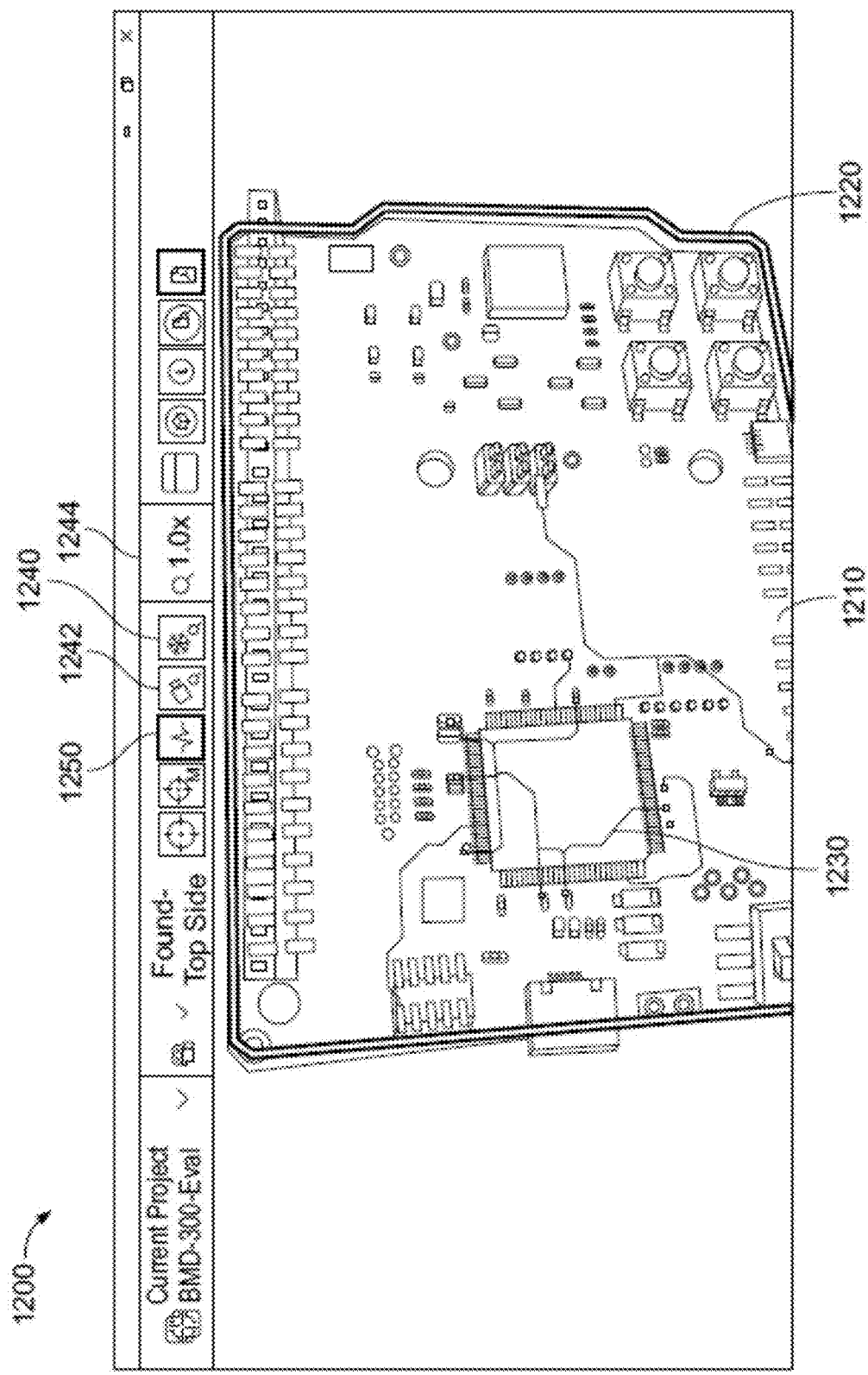
FIG. 12 is a GUI depicting a PCB in motion with superimposed information in accordance with an embodiment of the present disclosure.

Now referring to FIG. 12, a GUI 1200 is provided depicting a PCB 1210 in motion with superimposed information (e.g. overlays) in accordance with an embodiment of the present disclosure. Visualization process 10 allows the superimposed information to track with PCB 1210 and continue functioning even if the camera and/or client electronic device moves around. The client electronic device displaying the GUI, such as GUI 1200, not need to be stable, and even if a user's hand or some other object obstructs the view visualization process 10 will continue providing superimposed information over the respective location on the PCB.

If PCB 1210 is being moved in a video feed, GUI 1200 may stabilize the superimposed information selected by the user with an image stabilization algorithm. The image stabilization algorithm may be able to move the superimposed information with motion of PCB 1210. For example and as seen in GUI 1200, the angle of the superimposed information will continue to align with the corresponding physical component on PCB 1210 as the angle of PCB 1210 changes. Specifically in FIG. 12, with the image stabilization algorithm being utilized, GUI 1200 will move board outline 1220 and superimposed net 1230 to continue to align and resize the superimposed information to match the movement of PCB 1210. Image stabilization may be turned on/off by a user interacting with a button 1250.

An example of a superimposed net can be seen at superimposed net 1230. Superimposed net 1230 may show the circuit between desired components as a line connecting them.

GUI 1200 may also provide the user with the option to zoom the camera onto PCB 1210. The user may direct GUI 1200 to stop the camera image and lock the superimposed information (e.g. overlays) to the image with button 1240, also called a "freeze zoom." A freeze zoom may allow a user to move the camera away from looking at PCB 1210 will still keeping pertinent information accessible to the user in GUI 1200. The user may direct GUI 1200 to continue a video feed from the camera but still keep the superimposed information on PCB 1210 with button 1240, also called a "stretch zoom." The user may direct the camera to zoom onto the board with button 1244, also called a "camera zoom." In some circumstances, if the camera zoom is zoomed in too much on a small fraction of PCB 1210 and the camera may no longer recognize PCB 1210, however freeze zoom and stretch zoom can allow the user to still see the superimposed information over PCB 1210 in GUI 1200 at high zoom levels.

Now referring to FIGS. 13-16, a GUI 1300 is provided depicting various component information available to the user in accordance with an embodiment of the present disclosure. Visualization process 10 may include details about all of the various aspects of the design beyond just parsing signals, components, and layers. Users may have the option to display details of each component on the board, and pin connections on every unique signal (thereby tying components and signals together). Details of each component include, for example, but not limited to, location, polarity, value, description, supply chain availability and price, pin-out, etc. Specifically, GUI 1300 includes a view of PCB 1310, a component overlay 1320, component 1322, an information window 1330, and an information button 1340. Like in other example embodiments depicted in the figures, GUI 1300 include a PCB 1310 as seen through a camera. Component overlay 1320 is a superimposed marking over the corresponding component 1322, J2, on PCB 1310. Information regarding component overlay 1320 and it's respective component 1322 on PCB 1310 is displayed in information window 1330. Information window 1330 may be toggled on and off in GUI 1300 with information button 1340.

Figure 13:
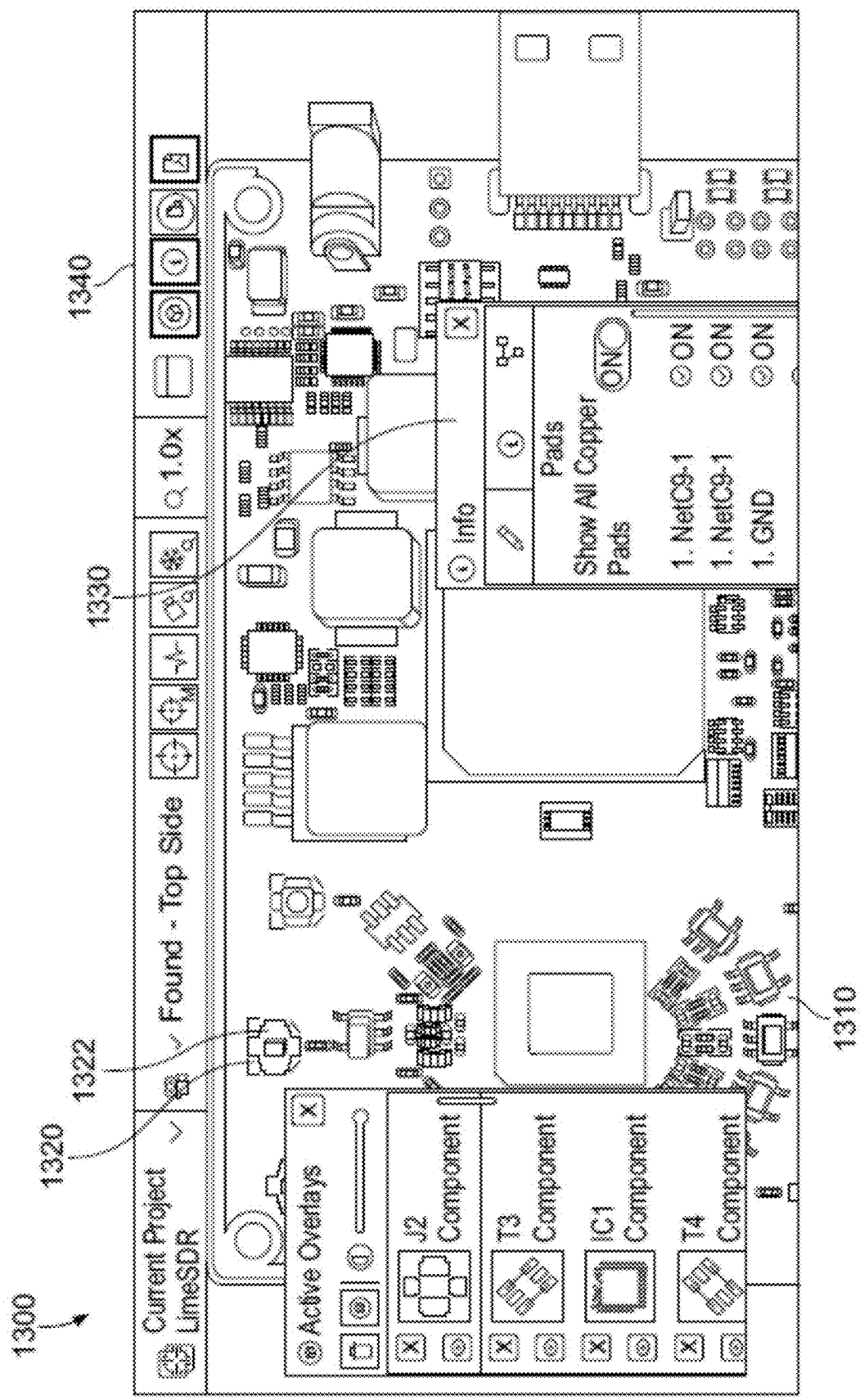
FIG. 13 is a GUI depicting component details for a component provided in accordance with an embodiment of the present disclosure.

In FIG. 13, information window 1330 may display information about the component or net selected in GUI 1300. Here, information window 1330 is displaying information about component 1322 and component overlay 1320. Information window 1330 may provide an option for the user to change component overlay 1320 to add or remove an overlay over each of individual copper pads of component 1322.

Figure 14:
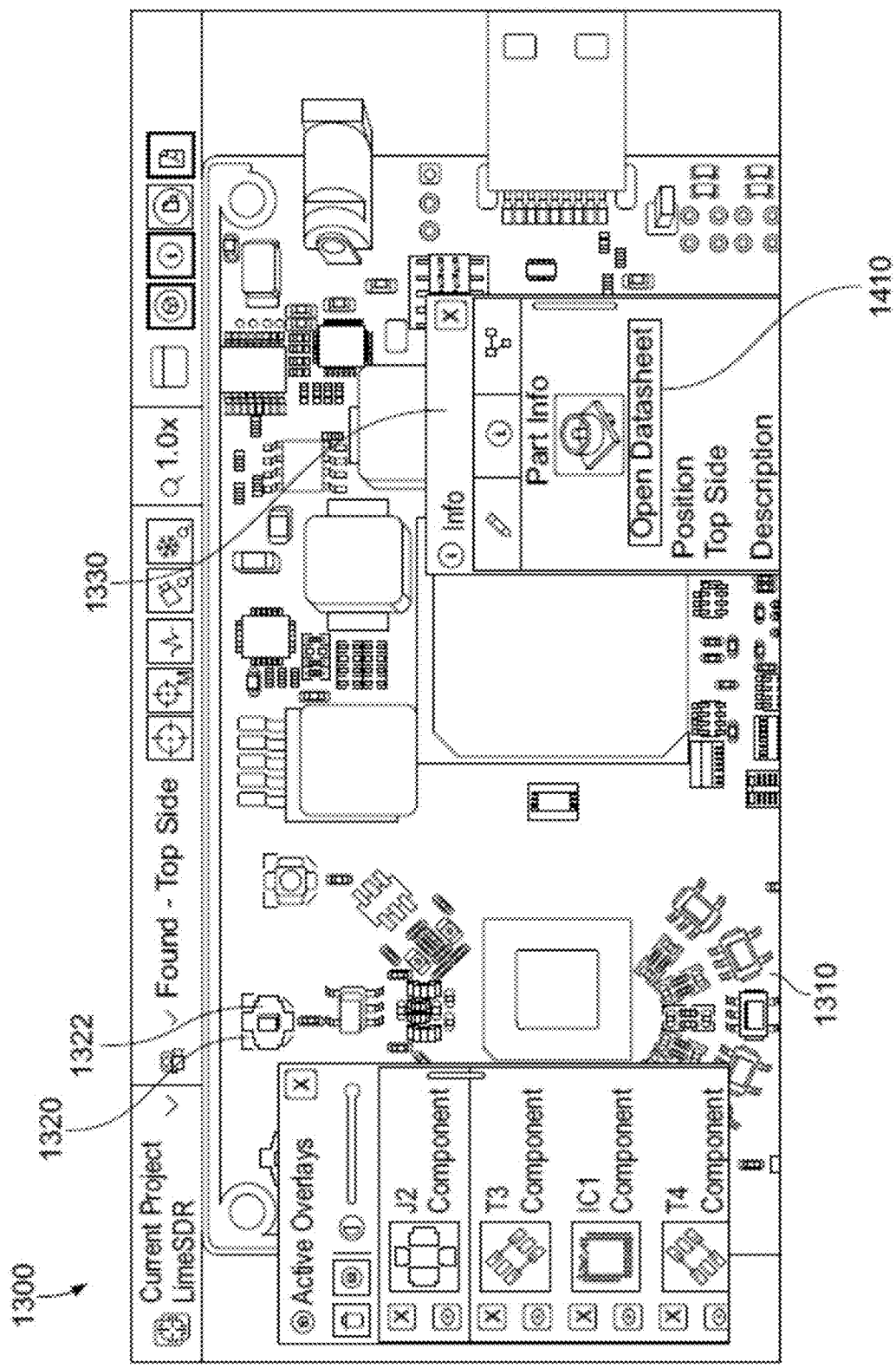
FIG. 14 is a GUI depicting component details for a component provided in accordance with an embodiment of the present disclosure.

In FIG. 14, information window 1330 may display information about component 1322 located on PCB 1310. The information displayed in information window 1330 may include data such as, but not limited to, a manufacturer datasheet, description of the component, a position location, a part number, a picture of the component, and electrical requirements. Information window 1330 may also contain a datasheet button 1410. Datasheet button 1410 may open a datasheet hosted on the component manufacturer's website or open a stored datasheet.

Figure 15:
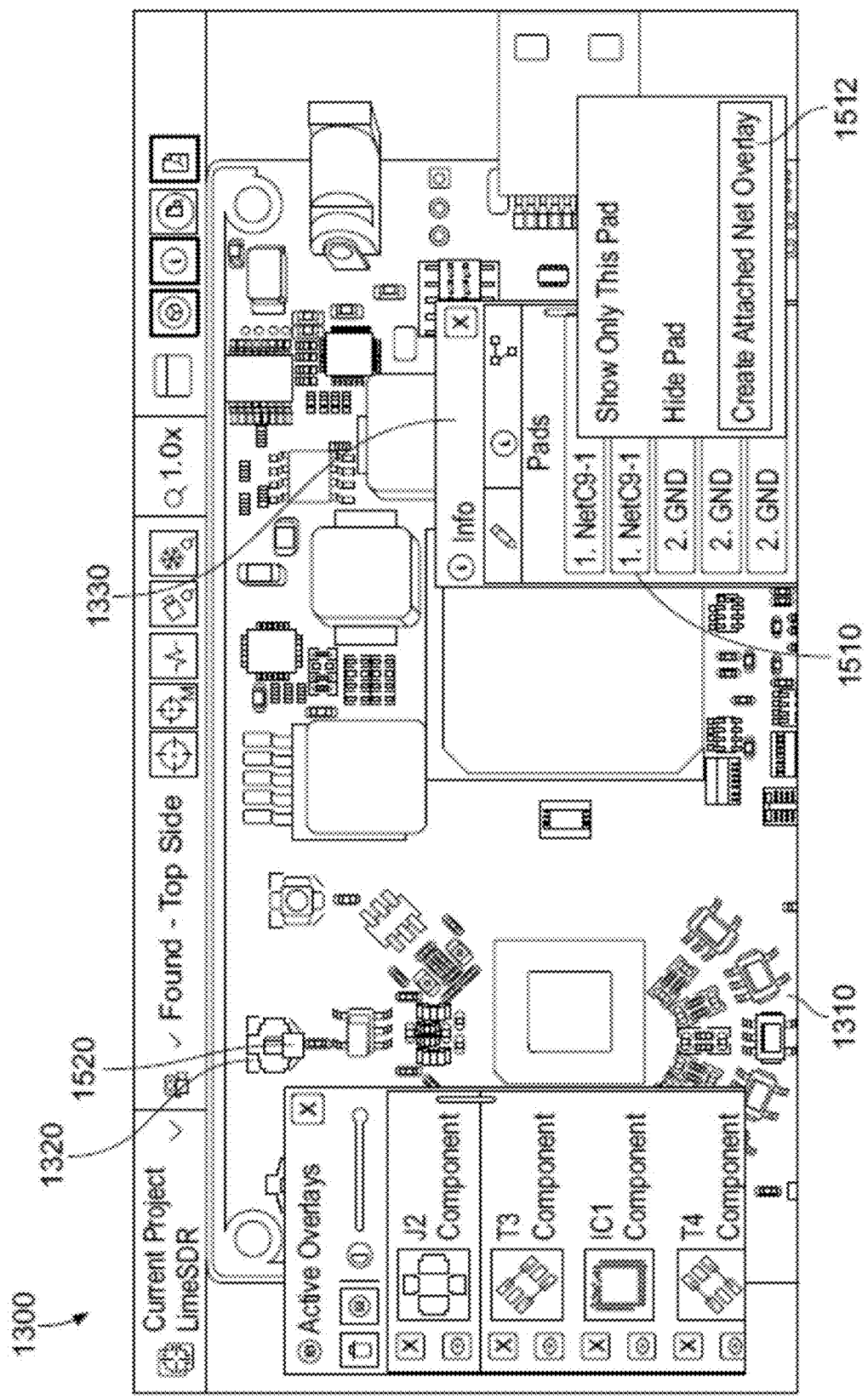
FIG. 15 is a GUI depicting component details for a component provided in accordance with an embodiment of the present disclosure.

In FIG. 15, information window 1330 may display information about the interconnection between the selected component (e.g., component 1332) and other components on PCB 1310. Each pad or piece of a component may be selectable, for example as a button 1510. GUI 1300 may provide the user with the option to automatically create an "attached net overlay," a net based on components connected to, for example, but not limited to, at least one of a selected component, net, and pad. GUI 1300 may automatically create the attached net overlay by a create advanced net overlay button 1512. Physical interconnection of PCB 1310 may be extracted by visualization process 10 from the associated EDA file. The physical interconnection of PCB 1310 between, for example, the nets and components may then be easily accessible to the user and depicted in an easy to understand format.

Figure 16:
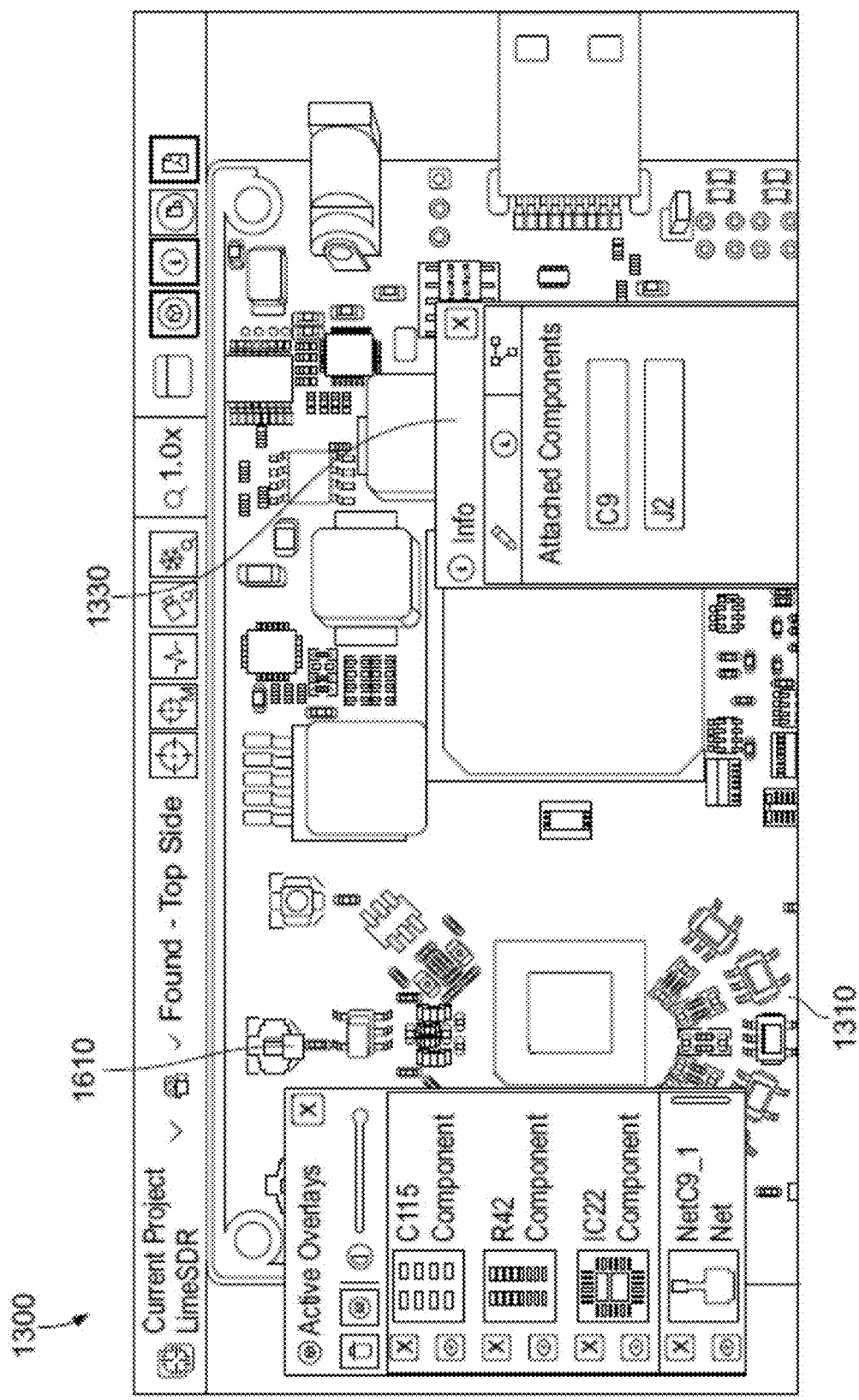
FIG. 16 is a GUI depicting component details for a component provided in accordance with an embodiment of the present disclosure.

In FIG. 16, once the attached net overlay is generated a net overlay 1610 may be created. Net overlay 1610 may be a superimposed image over PCB 1310. The superimposed image of net overlay 1610 may include the components connected to the previously selected component, net, and/or pad and the trace that connects the parts of PCB. Here, for example, net overlay 1610 was automatically generated from create advanced net overlay button 1512 and includes superimposed markings of components C9, J2 and a short trace that connects the previously selected pad of J2 to C9 on PCB 1310. Active overlay window may also show the shape of the net.

Information window 1330 may be populated from at least one of, but not limited to, an EDA file and a bill of material (BOM) file. Visualization process 10 may automatically extract and sort the information from the EDA file associated with the PCB to populate information window 1330. The EDA file may be uploaded to visualization process 10 prior to calibration. Visualization process 10 may automatically extract and sort the information from the BOM file. The BOM file may be extracted from the EDA file, stored by the user and accessed by visualization process 10, or both.

Figure 17:
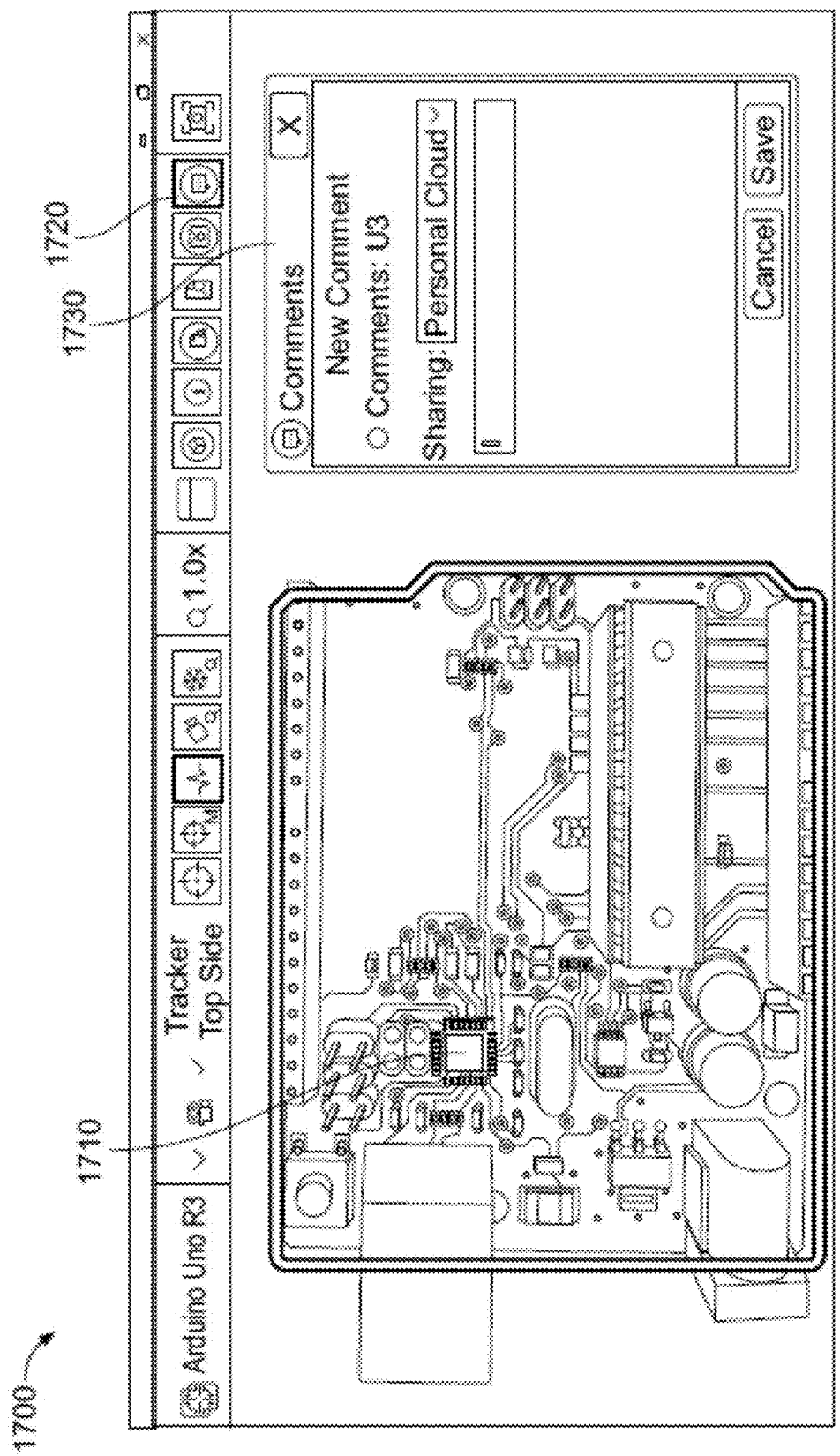
FIG. 17 is a GUI depicting overlay annotation for a component provided in accordance with an embodiment of the present disclosure.

Now referring to FIG. 17, a GUI 1700 depicting overlay annotation for a component provided in accordance with an embodiment of the present disclosure. For example, as shown by GUI 1700, if a component overlay 1710 is selected, a user may have the option to add a comment associated with component overlay 1710. While GUI 1700 shows a comment associated with a component, comments or other annotations may be added to and associated with other overlays such as, for example, but not limited to, a net overlay, a layer within the PCB, and a level for the entire PCB. GUI 1700 may allow the user the option to add a comment by a comment button 1720. Comments may be added via a comment window 1730. Comments may be saved to a client electronic device or saved to the cloud. Comments may include statements that are a few words and may also include extensive written instructions to debug and troubleshoot specified components.

Figure 18:
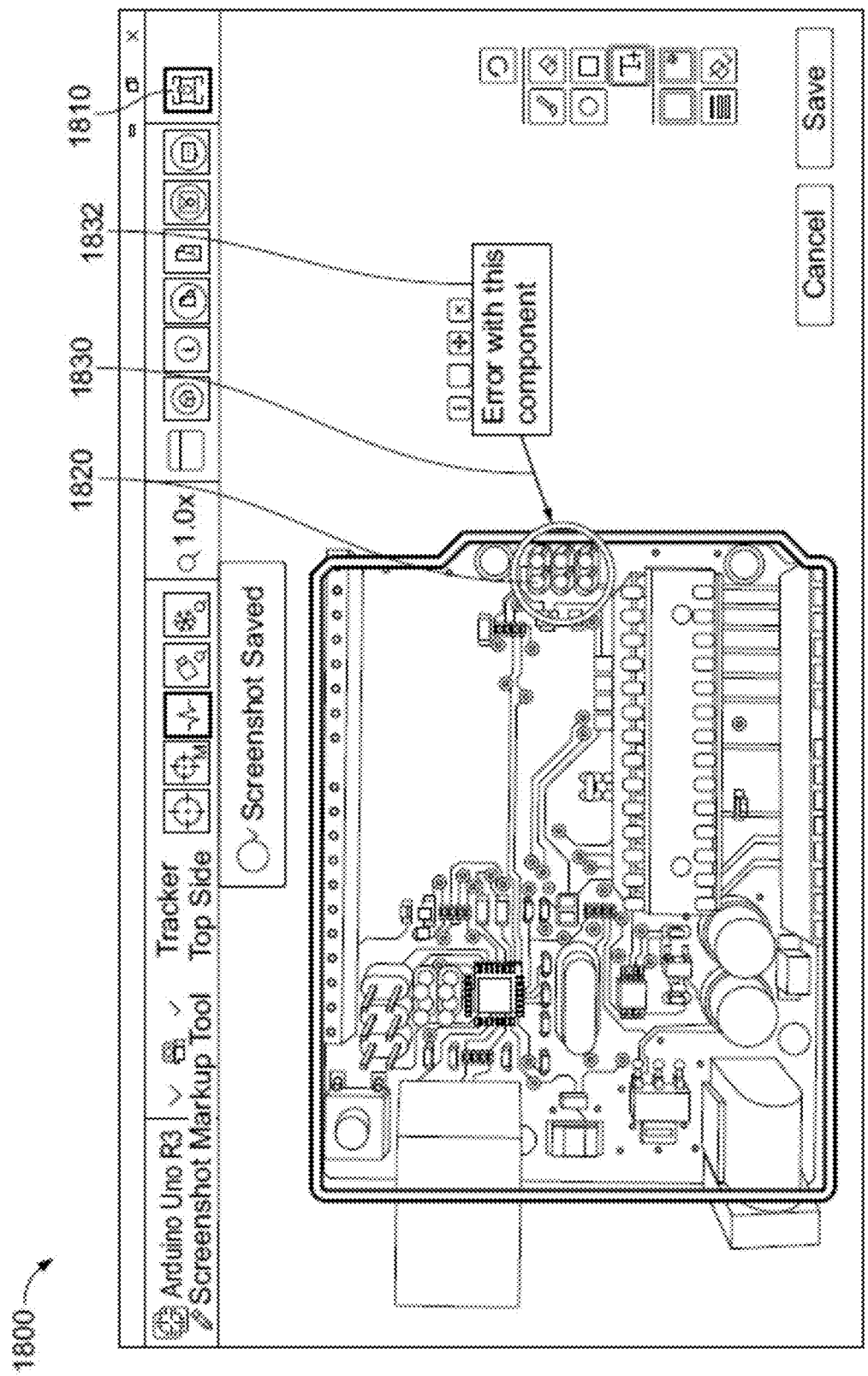
FIG. 18 is a GUI depicting static annotation for a component provided in accordance with an embodiment of the present disclosure.

Now referring to FIG. 18, a GUI 1800 depicting static annotation for a component provided in accordance with an embodiment of the present disclosure. For example, as shown by GUI 1800, the user may have the option to be able to store a static image of the PCB displayed in GUI 1800 and apply markings and text. For example, a component overlay 1820 may be saved in the static image. The user may have the option to draw lines 1830 and create text 1832. The user may have the option to utilize basic image editing capabilities to annotate the static image such as, but not limited to a paintbrush, changing colors, erasing, creating shapes such as rectangles and circles, and adding text. By being able to save as a static image, the user may share the annotations to users without the need for any special software or training.

As shown in FIGS. 17-18, information may be directly stored onto a graphical representation of a PCB using visualization process 10. The information may be transferred easily between personnel (e.g., engineers and/or technicians) who may need to quickly understand and troubleshoot the PCB. Furthermore, the information may take the form of work instructions provided to users using the annotation capabilities of visualization process 10. The work instructions may be sent and received by visualization process 10 from one client electronic device to a second client electronic device. The work instructions may correspond to one or more of a PCB assembly task, a re-work, a board bring up task, or a debugging procedure. Visualization process 10 may display individual instructions of a work instruction in stages to the user. In some embodiments, the individual instructions may be provided in stages to walk the user through a more complicated task.

Work instructions that have the ability to be overlaid onto physical object to be worked in ("device-under-test," like a physical printed circuit board) with the use of visualization process 10 and thereby create "smart work orders." The work orders may then be interacted with by assignor and assignee, and may be tracked in real-time. Work instructions within the work order are created by an assigner, and assigned to an assignee. Assigners may develop detailed instructions for printed circuit board assembly, testing, inspection, re-work, board bring-up, and debugging, and have specific instructions and comments tied to design elements on the printed circuit board. An example of this capability of visualization process 10 may be seen in at least FIGS. 17-18. The assigner may create custom tasks, and tie specific parts of that task to places on the physical device-under-test. For PCB assembly and board bring-up, tasks may be created for the assembly to happen in stages. A set of instructions may be designed around assembling a sub-circuit on the printed circuit board, with each component in this sub-circuit highlighted for ease of use and traceability. Smart work orders also allow the assignor and assignee to add comments on any part of the work order, and have it also be overlaid on the device-under-test for complete transparency and visibility. Smart work orders may also be tied directly into electronic design automation and computer aided design (CAD) tools, to become a fully integrated part of an organization's workflow management and issue-tracking system.

Visualization process 10, as exemplified in the various descriptions and figures above, provides numerous advantages over traditional methods. Visualization process 10 may identify PCB components and signals for the purpose of debugging. Visualization process 10 may identifies PCB components and signals for the purpose of board assembly. For example, board assembly may be quicker and with less errors for soldering and mounting various components on a circuit board. Visualization process 10 may identify and visually mark: the location of a particular component needs to be assembled on the PCB in accordance with the design; the orientation and polarity of the particular component; and the actual value and description of the particular component to ensure proper assembly.

Visualization process 10 may identify components and signals for the purpose of measuring temperatures. Visualization process 10 may identity components and signals for compiling thermal data, voltage measurements, and design file analysis to generate automated suggestions for debugging. Automated suggestions may include identifying power lines and suggesting physical points of measurements for a digital mustimeter and oscilloscope to capture signal integrity, signal value and strength, and any bugs and/or insight that may be identified by analyzing the signals. Visualization process 10 may identify which components and exposed metal areas (e.g., pins on a component) a particular signal is running through, so the user may easily understand where they need to make electrical contact with a type of measurement probe and take a measurement.

Visualization process 10 may allow for use of comprehensive monitoring stations through which all debugging and physical circuit inspection and analysis may occurs. This monitoring station will take captured waveforms, measurements, and data found on various pieces of test equipment (e.g., oscilloscopes, digital multimeters, spectrum analyzers, logic analyzers, etc.), and present that data digitally on a monitor that also shows an overlay of the circuit design onto the physical circuit board. This allows the user to take measurements in areas shown and recommended by the overlay and software, with different tools (oscilloscope, digital multimeter, etc.), and see at least one of measurements, waveforms, and readings directly on this main monitor and debugging station.

Visualization process 10 may receive signals from one or more test equipment over a network and may display the signals and/or representations of the signals. The signals may be merged by visualization process 10 with an EDA file. Because visualization process 10 may create a homography between EDA design elements and the PCB, further data may be added to the PCB from test equipment which do not understand this homography. For example, a circuit described in an EDA file may incorporated into visualization process 10. Then the circuit may be measured by a multimeter, and measurement data collected by the multimeter may be transmitted over a network where the measurement data may be integrated into a visual display created by visualization process 10.

In some embodiments, visualization process 10 may superimpose the signals over a PCB and may create a homography with the EDA file, the image of the PCB and signal. For example, a thermal camera may provide signals to visualization process 10 and be superimposed over the PCB. In this example, the thermal camera may be located at a fixed distance relative to our camera, and thus the thermal camera's homography is also understood by visualization process 10. Measurement data may be exchanged and then displayed to the user in the same homography as EDA file data.

Visualization process 10 may allow for ease of tele-engineering services. Tele-engineering is the distribution of electronics and hardware-related services, support, and information via electronic information and telecommunication technologies. Specifically tele-engineering may bring all of the different elements of a design (schematic, layout, bill of materials, fabrication notes, etc.), manufacturing history, component purchasing history, product lifecycle management information, workflow management details, issue-tracking information, test and measurement information (examples include oscilloscope waveforms, logic analyzer readouts, digital multimeter measurements, etc.) into a single viewport, accessible through a common application and interface. It allows long-distance contact, monitoring, advice, debugging, collaboration, and education. When passing work instructions from one client electronic device to another, physical distances between users, concerns about sending native intellectual property over the internet, decreased funding, or a lack of staff restrict engineers to working on problems locally, tele-engineering, and thus visualization process 10, may bridge the gap.

Visualization process 10 may also be included and effectively used in engineering and educational distance-learning; meetings, supervision, support, and presentations between engineering organizations, suppliers, end-users, and between each of these individual groups; online information and management and bill of materials, hardware design, product lifecycle management, and workflow management. Tele-engineering could include two hardware engineers discussing a particular hardware design challenge over video call; an engineering organization assisting and communicating with their contract manufacturer in a different country, and walking them through a particular printed circuit board test and re-work sequence. Physical hardware inspection, design, test, debug, and assemblies done via digital monitoring instruments, live feed, and application combinations; test, inspection, and relevant measurement data being forwarded between facilities for interpretation by different engineers and technicians; live monitoring through continuous sending of test data; teacher to student online conference.

It will be apparent to those skilled in the art that various modifications and variations may be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method comprising:
   capturing an image of an electronic circuit using a smartphone;
   receiving, at the smartphone, work instructions corresponding to the electronic circuit, wherein the work instructions correspond to an assembly task;
   causing the display of a real-time image of the electronic circuit at a display screen associated with the smartphone, wherein the relative position and orientation of the electronic circuit shown in the real-time image is user variable;
   causing an overlay display of a graphical representation of the electronic circuit on top of the electronic circuit shown in the real-time image, wherein the graphical representation of the electronic circuit is continually reoriented to match the planar alignment of the real-time image of the electronic circuit shown at the display screen;
   causing an overlay display of user selectable information associated with the graphical representation of the electronic circuit shown in the real-time image of the electronic circuit shown at the display screen;
   allowing a user to select a first component of the electronic circuit at the display screen; and
   causing the display a first work instruction at the display screen, wherein the first work instruction corresponds to the selected component.

2. The computer-implemented method of claim 1, wherein receiving the work instructions includes receiving the work instructions from a second computing device.

3. The computer-implemented method of claim 1, wherein displaying at least one instruction includes displaying a plurality of instructions in stages at the display screen.

4. The computer-implemented method claim 1, further comprising:
   allowing a user to select a subcircuit of the electronic circuit at the display screen.

5. The computer-implemented method claim 4, further comprising:
   displaying a subcircuit work instruction, based upon, at least in part, the selected subcircuit.

6. A non-transitory computer-readable storage medium having stored thereon instructions that when executed by a machine result in the following operations:
   capturing an image of an electronic circuit using a smartphone;
   receiving, at the mobile client electronic device, work instructions corresponding to the electronic circuit, wherein the work instructions correspond to an assembly task;
   causing the display of a real-time image of the electronic circuit at a display screen associated with the smartphone, wherein the relative position and orientation of the electronic circuit shown in the real-time image is user variable;
   causing an overlay display of a graphical representation of the electronic circuit on top of the electronic circuit shown in the real-time image, wherein the graphical representation of the electronic circuit is continually reoriented to match the planar alignment of the real-time image of the electronic circuit shown at the display screen;
   causing an overlay display of user selectable information on associated with the graphical representation of the electronic circuit shown in the real-time image of the electronic circuit shown at the display screen; allowing a user to select a first component of the electronic circuit at the display screen; and causing the display a first work instruction at the display screen, wherein the first work instruction corresponds to the selected component.

7. The non-transitory computer-readable storage medium of claim 6, wherein receiving the work instructions includes receiving the work instructions from a second computing device.

8. The non-transitory computer-readable storage medium of claim 6, wherein displaying at least one instruction includes displaying a plurality of instructions in stages at the display screen.

9. The non-transitory computer-readable storage medium of claim 6, further comprising:
   allowing a user to select a subcircuit of the electronic circuit at the display screen.

10. The non-transitory computer-readable storage medium of claim 9, further comprising:
   displaying a subcircuit work instruction, based upon, at least in part, the selected subcircuit.

11. A system for use in an electronic design environment comprising:
   a handheld client electronic device configured to capture an image of an electronic circuit, and to receive work instructions corresponding to an electronic circuit, wherein the work instructions correspond to an assembly task, the handheld client electronic device further configured to cause the display of a real-time image of the electronic circuit at a display screen associated with the handheld electronic device, wherein the relative position and orientation of the electronic circuit shown in the real-time image is user variable, and to cause an overlay display of a graphical representation of the electronic circuit, on top of the electronic circuit shown in the real-time image, wherein the graphical representation of the electronic circuit is continually reorientated to match the planar alignment of the real-time image of the electronic circuit shown at the display screen, the handheld client electronic device further configured to cause an overlay display of user selectable information associated with the graphical representation of the electronic circuit and, and to allow a user to select a first superimposed component of the electronic circuit at the display screen and to cause the display of a first work instruction at the display screen, wherein the first work instruction corresponds to the selected component.

12. The system of claim 11, wherein receiving the work instructions includes receiving the work instructions from a second computing device.

13. The system of claim 11, wherein displaying at least one instruction includes displaying a plurality of instructions in stages at the display screen.

* * * * *